(12) United States Patent
Narayana et al.

(10) Patent No.: US 11,571,813 B2
(45) Date of Patent: Feb. 7, 2023

(54) SYSTEMS AND METHODS FOR MANAGING A SEMANTIC MAP IN A MOBILE ROBOT

(71) Applicant: iRobot Corporation, Bedford, MA (US)

(72) Inventors: Manjunath Narayana, Pasadena, CA (US); Andreas Kolling, Pasadena, CA (US); Philip Fong, South Pasadena, CA (US)

(73) Assignee: iRobot Corporation, Bedford, MA (US)

( * ) Notice: Subject to any disclaimer, the term of this patent is extended or adjusted under 35 U.S.C. 154(b) by 192 days.

(21) Appl. No.: 16/804,749

(22) Filed: Feb. 28, 2020

(65) Prior Publication Data

US 2021/0268652 A1    Sep. 2, 2021

(51) Int. Cl.
  *B25J 9/16*  (2006.01)
  *B25J 13/08*  (2006.01)
  *B25J 19/02*  (2006.01)
(52) U.S. Cl.
  CPC ............. *B25J 9/1664* (2013.01); *B25J 9/161* (2013.01); *B25J 9/1653* (2013.01); *B25J 9/1679* (2013.01); *B25J 9/1694* (2013.01); *B25J 13/086* (2013.01); *B25J 19/02* (2013.01)
(58) Field of Classification Search
  None
  See application file for complete search history.

(56) References Cited

U.S. PATENT DOCUMENTS

| 9,233,472 | B2 * | 1/2016 | Angle | G06Q 20/202 |
| 9,375,847 | B2 | 6/2016 | Angle et al. | |
| 9,380,922 | B2 | 7/2016 | Duffley et al. | |

(Continued)

FOREIGN PATENT DOCUMENTS

| JP | 2019076658 A * | 5/2019 | ............... A47L 9/28 |
| WO | WO-2021173308 A1 | 9/2021 | |

OTHER PUBLICATIONS

"International Application Serial No. PCT US2021 016160, International Search Report dated Apr. 26, 2021", 4 pgs.

(Continued)

*Primary Examiner* — Abby Y Lin
*Assistant Examiner* — Dylan Brandon Mooney
(74) *Attorney, Agent, or Firm* — Schwegman Lundberg & Woessner, P.A.

(57) ABSTRACT

Described herein are systems, devices, and methods for maintaining a valid semantic map of an environment for a mobile robot. A mobile robot comprises a drive system, a sensor circuit to sense occupancy information, a memory, a controller circuit, and a communication system. The controller circuit can generate a first semantic map corresponding to a first robot mission using first occupancy information and first semantic annotations, transfer the first semantic annotations to a second semantic map corresponding to a subsequent second robot mission. The control circuit can generate the second semantic map that includes second semantic annotations generated based on the transferred first semantic annotations. User feedback on the first or the second semantic map can be received via a communication system. The control circuit can update first semantic map and use it to navigate the mobile robot in a future mission.

19 Claims, 24 Drawing Sheets

(56) References Cited

U.S. PATENT DOCUMENTS

| | | | |
|---|---|---|---|
| 9,802,322 | B2 | 10/2017 | Angle et al. |
| 9,874,873 | B2 | 1/2018 | Angle et al. |
| 10,100,968 | B1 | 10/2018 | Chow et al. |
| 2016/0282126 | A1* | 9/2016 | Watts ................ H04W 4/029 |
| 2016/0282862 | A1 | 9/2016 | Duffley et al. |
| 2017/0203446 | A1 | 7/2017 | Dooley et al. |
| 2017/0225336 | A1 | 8/2017 | Deyle et al. |
| 2018/0071918 | A1 | 3/2018 | Angle et al. |
| 2018/0304472 | A1 | 10/2018 | Angle et al. |
| 2019/0032842 | A1 | 1/2019 | Chow et al. |
| 2019/0097827 | A1 | 3/2019 | Angle et al. |
| 2019/0187703 | A1 | 6/2019 | Millard et al. |
| 2019/0212752 | A1* | 7/2019 | Fong ................ G06K 9/00 |
| 2019/0219401 | A1 | 7/2019 | Daniilidis et al. |
| 2020/0180142 | A1 | 6/2020 | Chow et al. |

OTHER PUBLICATIONS

"International Application Serial No. PCT US2021 016160, Written Opinion dated Apr. 26, 2021", 7 pgs.

"Munich, et al Control of Autonomous Mobile Robots, U.S. Appl. No. 16/425,658, filed, May 29, 2019, 71 pgs".

Acar, Ercan U, "Morse Decompositions for Coverage Tasks", The International Journal of Robotics Research, (Apr. 2002), 14 pgs.

Agmon, Noa, "The giving tree: constructing trees for efficient offline and online multi-robot coverage", Ann Math Artif Intell Springer Science + Business Media B.V., (Mar. 18, 2009), 26 pgs.

Ahmadi, Mazda, "A Multi-Robot System for Continuous Area Sweeping Tasks", Proceedings 2006 IEEE International Conference on Robotics and Automation, (2006), 6 pgs.

Arkin, Esther M, "Approximation algorithms for lawn mowing and milling", Computational Geometry 17, (2000), 26 pgs.

Avellar, Gustavo S.C., "Multi-UAV Routing for Area Coverage and Remote Sensing with Minimum Time", Sensors 2015, 15, (2015), 21 pgs.

Barrientos, Antonio, "Aerial Remote Sensing in Agriculture: A Practical Approach to Area Coverage and Path Planning for Fleets of Mini Aerial Robots", Journal of Field Robotics 28(5), (2011), 23 pgs.

Bast, Hannah, "The Area Partitioning Problem", 12th Canadian Conference on Computational Geometry, (2000), 163-172.

Bochkarev, Stanislav, "On Minimizing Turns in Robot Coverage Path Planning", 2016 IEEE International Conference on Automation Science and Engineering (CASE), (2016), 6 pgs.

Choset, Howie, "Coverage Path Planning: The Boustrophedon Cellular Decomposition", Field and Service Robotics, (1997), 7 pgs.

Choset, Howie, "Coverage for robotics—A survey of recent results", Annals of Mathematics and Artificial Intelligence 31, (2001), 113-126.

Christofides, Nicos, "Worst-Case Analysis of a New Heuristic for the Travelling Salesman Problem", Managenecv Sciences Research Report se. 388, (Feb. 1976), 11 pgs.

Ding, Donghong, "A tool-path generation strategy for wire and arc additive manufacturing", International Journal of Advanced Manufacturing Technology, 73, (2014), 18 pgs.

Floyd, Robert W, "Algorithms", Communications of the ACM, (1962), 344-348.

Held, Martin, "On the Computational Geometry of Pocket Machining", (1991), 62 pgs.

Hert, Susan, "Polygon Area Decomposition for Multiple-Robot Workspace Division", International Journal of Computational Geometry and Applications vol. 08, No. 04 (1998), 25 pgs.

Huang, Wesley H, "Optimal Line-sweep-based Decompositions for Coverage Algorithms", Proceedings of the 2001 IEEE International Conference on Robotics and Automation, (2001), 6 pgs.

Kapoutsis, Athanasios CH, "DARP: Divide Areas Algorithm For Optimal Multi-Robot Coverage Path Planning", Journal of Intelligent and Robotic Systems manuscript No., (2017), 16 pgs.

Karapetyan, Nare, "Efficient Multi-Robot Coverage of a Known Environment", 2017 IEEE RSJ International Conference on Intelligent Robots and Systems (IROS), (Sep. 2017), 7 pgs.

Kivelevitch, Elad, "A Hierarchical Market Solution to the Min-Max Multiple Depots Vehicle Routing Problem", Unmanned Systems, vol. 2, No. 1, (2014), 15 pgs.

Kong, Chan, "Distributed Coverage with Multi-Robot System", Proceedings of the 2006 IEEE International Conference on Robotics and Automation, (May 2006), 7 pgs.

Li, Yan, "Coverage path planning for UAVs based on enhanced exact cellular decomposition method", Mechatronics 21, (2011), 876-885.

Lin, S, "An Effective Heuristic Algorithm for the Traveling-Salesman Problem", Operations Research, vol. 21, No. 2, (1973), 498-516.

Maza, Ivan, "Multiple UAV cooperative searching operation using polygon area decomposition and efficient coverage algorithms", Distributed Autonomous Robotic Systems 6, (2007), 10 pgs.

Papadimitriou, Christos H., "The Euclidean Traveling Salesman Problem IS NP—Complete", Theoretical Computer Science 4, (1977), 237-244.

Rekleitis, Ioannis, "Efficient Boustrophedon Multi-Robot Coverage: an algorithmic approach", Ann Math Artif Intell 52, (2008), 109-142.

Sheng, Weihua, "Surface Partitioning in Automated CAD-Guided Tool Planning for Additive Manufacturning", Int. Conference on intelligent Robots and Systems, (2003), 2072-2077.

Wang, Yongzhen, "Memetic algorithm based on sequential variable neighborhood descent for the minmax multiple traveling salesman problem", Computers and Industrial Engineering 106, (2017), 105-122.

Welzl, Emo, "Constructing the Visibility Graph For n-Line Segments In O(n2) Time", Information Processing Letters 20, (May 10, 1985), 167-171.

Xu, Anqi, "Efficient complete coverage of a known arbitrary environment with applications to aerial operations", Auton Robot 36, (2014), 365-381.

"International Application Serial No. PCT US2021 016160, International Preliminary Report on Patentability dated Sep. 9, 2022", 9 pgs.

* cited by examiner

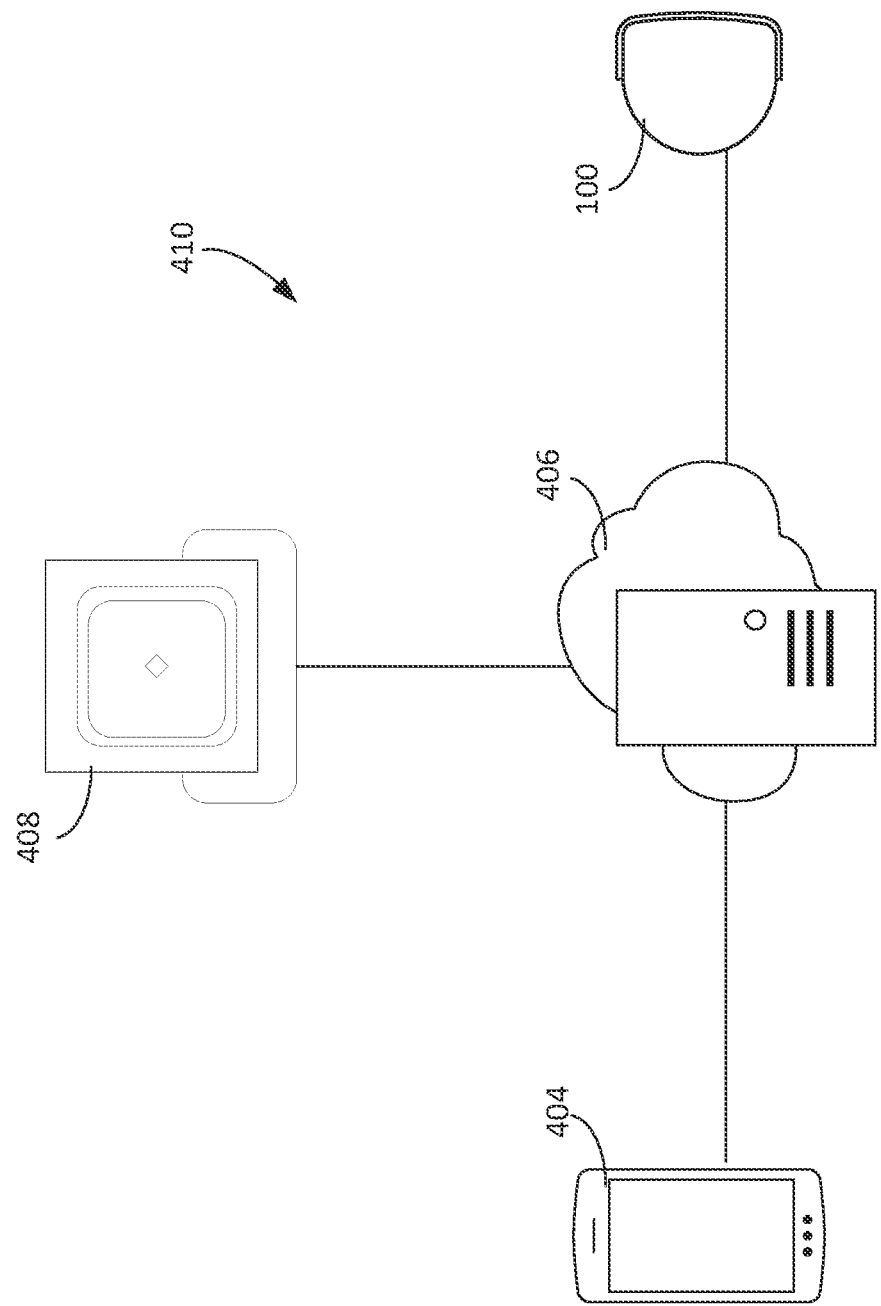

SYSTEMS AND METHODS FOR MANAGING A SEMANTIC MAP IN A MOBILE ROBOT

TECHNICAL FIELD

This document relates generally to mobile robots and, more particularly, to systems, devices, and methods for generating and managing a semantic map in a mobile robot.

BACKGROUND

Autonomous mobile robots can move about an environment, and perform several functions and operations in a variety of categories, including but not limited to security operations, infrastructure or maintenance operations, navigation or mapping operations, inventory management operations, and robot/human interaction operations. Some mobile robots, known as cleaning robots, can autonomously perform cleaning tasks within an environment. e.g., a home. Many kinds of cleaning robots are autonomous to some degree and in different ways. For example, a cleaning robot can conduct cleaning missions, where the robot traverses and simultaneously ingests (e.g., vacuums) debris from the floor surface of their environment.

Some mobile robots are capable of storing a map of the robot environment. The mobile robot can use the map to fulfill its goals such as path planning and navigating the mobile robot in the environment.

SUMMARY

This document describes systems, devices, and methods for generating and maintaining a valid semantic map of an environment for a mobile robot (or a "robot"). According to one example, a mobile robot comprises a drive system to move the mobile robot about an environment, a sensor circuit to sense occupancy information in the environment, a memory, a controller circuit, and a communication system. The controller circuit can generate, and store in the memory, a first semantic map corresponding to a first mission of the mobile robot using first occupancy information and first semantic annotations. The first semantic annotations represent spatial and contextual information of objects in the environment corresponding to the first mission. The controller circuit can transfer the first semantic annotations from the first semantic map to a second semantic map that corresponds to a second mission of the mobile robot in the environment subsequent to the first mission, and generate the second semantic map using second occupancy information and the second semantic annotations. The second mission can be a mission immediately following the first mission. Alternatively, the second mission can be a mission subsequent to, but not immediately following, the first mission. The second semantic annotations represent spatial and contextual information of objects in the environment, and can be generated using the transferred first semantic annotations. The control circuit can determine whether or not to update the first semantic map based on a comparison between the first and the second semantic maps. Semantic update can be attempted at a specified frequency (e.g., periodically) or according to a specific schedule, such as for every mission, every N missions (N>1, for example, every 5-10 missions), every week, or every month. Additionally or alternatively, semantic update can be attempted in response to a user command. The communication system can transmit information about one or more of the first or second semantic map to a user interface, and receive user feedback on the first or the second semantic map.

According to one example, a method comprises steps of providing to a user a first semantic map corresponding to a first mission of the mobile robot in the environment, and a second semantic map corresponding to a second mission of the mobile robot subsequent to the first mission. The first semantic map can include first occupancy information and first semantic annotations representing spatial and contextual information of objects in the environment. The second semantic map can include second occupancy information and second semantic annotations representing spatial and contextual information of objects in the environment. The method includes receiving an instruction from the user to modify the first semantic annotations on the first semantic map or to modify the second semantic annotations on the second semantic map, updating the first semantic map based on a comparison between the second semantic map and the first semantic map, and storing the updated first semantic map in the memory for use in future missions of the mobile robot.

Example 1 is a mobile robot, comprising: a drive system configured to move the mobile robot about an environment; a sensor circuit configured to sense occupancy information in the environment; a memory; a controller circuit, and a communication system. The controller circuit can be configured to: generate, and store in the memory, a first semantic map corresponding to a first mission of the mobile robot in the environment using first occupancy information and first semantic annotations, the first semantic annotations representing spatial and contextual information of objects in the environment corresponding to the first mission; and transfer the first semantic annotations from the first semantic map to a second semantic map, the second semantic map corresponding to a second mission of the mobile robot in the environment subsequent to the first mission; generate the second semantic map using second occupancy information and the second semantic annotations, the second semantic annotations representing spatial and contextual information of objects in the environment and being generated using the transferred first semantic annotations; and determine whether or not to update the first semantic map based on a comparison between the first and the second semantic maps. The communication system can be configured to transmit information about one or more of the first or second semantic map to a user interface, and to receive user feedback on the first or the second semantic map.

In Example 2, the subject matter of Example 1 optionally includes the controller circuit that can be configured to plan a path or to navigate the mobile robot about the environment according to an updated first semantic map if the second semantic annotations satisfy a validity and constraint check, or according to the first semantic map if the second semantic annotations fail to satisfy the validity and constraint check.

In Example 3, the subject matter of any one or more of Examples 1-2 optionally includes the first and the second occupancy information each include location and geometry of one or more of a free area, an occupied area, or an unexplored area in the environment corresponding to respective missions; and the controller circuit that can be configured to generate a first occupancy map using the first occupancy information, and to generate a second occupancy map using the second occupancy information.

In Example 4, the subject matter of any one or more of Examples 1-3 optionally includes the first semantic annotations and the second semantic annotations each of which can include characteristics of the objects in the environment, the characteristics including one or more of: an object identification; an object location; a physical attribute of an object; or a spatial constraint of an object relative to another object in the environment.

In Example 5, the subject matter of any one or more of Examples 1-4 optionally includes the controller circuit that can be configured to: classify the objects into a plurality of object types; and generate the first semantic annotations or the second semantic annotations based on the classification of the objects.

In Example 6, the subject matter of any one or more of Examples 1-5 optionally includes the communication system that can be configured to receive a user input for generating or modifying the first or second semantic annotations.

In Example 7, the subject matter of any one or more of Examples 1-6 optionally includes the controller circuit that can be configured to transfer the first semantic annotations from the first semantic map to the second semantic map, including: integrate locations of the first semantic annotations into a localization system of the mobile robot; track motions of the first semantic annotations during the second mission in the environment; and generate the second semantic annotations using the tracked motions of the first semantic annotations.

In Example 8, the subject matter of any one or more of Examples 1-7 optionally includes the controller circuit that can be configured to detect a semantic conflict between the first and second semantic maps using a precision and recall measure between the first and second semantic maps, the semantic conflict representing a semantic annotation included in the first semantic map and absent from the second semantic map.

In Example 9, the subject matter of Example 8 optionally includes the controller circuit that can be configured to resolve the detected semantic conflict, including: generate a difference occupancy map between the first and second occupancy maps; modify the second occupancy map by adding thereto a portion of the difference occupancy map corresponding to a region on the second semantic map that adjoins the detected semantic conflict; and reconstruct the second semantic map using the modified second occupancy map and the second semantic annotations.

In Example 10, the subject matter of any one or more of Examples 1-9 optionally includes the controller circuit that can be configured to: detect a novel semantic object from the second semantic map, the novel semantic object absent from the first semantic map; include into the second semantic map a supplemental semantic annotation for the novel semantic object if the supplemental semantic annotation satisfies constraints relative to the second semantic annotations on the second semantic map.

In Example 11, the subject matter of Example 10 optionally includes the controller circuit that can be configured to detect the novel semantic object in response to a size of a semantically annotated region on the second semantic map exceeding, by a threshold, a size of a corresponding semantically annotated region on the first semantic map.

In Example 12, the subject matter of Example 11 optionally includes the supplemental semantic annotation that can have a relaxed constraint relative to other semantic annotations than mutual constraints among the semantic annotations on the second semantic map.

Example 13 is a system comprising a mobile robot and a user interface. The mobile robot includes: a drive system configured to move the mobile robot about an environment; a sensor circuit configured to sense occupancy information in the environment; a memory; a communication system; and a controller circuit. The controller circuit can be configured to: generate, and store in the memory, a first semantic map corresponding to a first mission of the mobile robot in the environment using first occupancy information and first semantic annotations, the first semantic annotations representing spatial and contextual information of objects in the environment corresponding to the first mission; and transfer the first semantic annotations from the first semantic map to a second semantic map, the second semantic map corresponding to a second mission of the mobile robot in the environment subsequent to the first mission; generate the second semantic map using second occupancy information and the second semantic annotations, the second semantic annotations representing spatial and contextual information of objects in the environment and being generated using the transferred first semantic annotations; and determine whether or not to update the first semantic map based on a comparison between the first and the second semantic maps. The user interface can be communicatively coupled to the mobile robot, and configured to display the first or second semantic map, and to receive user feedback on the first or the second semantic map.

Example 14 is a method for operating a mobile robot, the method comprising steps of: providing to a user a first semantic map stored in a memory, the first semantic map corresponding to a first mission of the mobile robot in the environment, the first semantic map including first occupancy information and first semantic annotations, the first semantic annotations representing spatial and contextual information of objects in the environment; providing to the user a second semantic map corresponding to a second mission of the mobile robot in the environment subsequent to the first mission, the second semantic map including second occupancy information and second semantic annotations, the second semantic annotations representing spatial and contextual information of objects in the environment; receiving an input from the user to modify the first semantic annotations on the first semantic map, or to modify the second semantic annotations on the second semantic map; updating the first semantic map based on a comparison between the second semantic map and the first semantic map; and storing the updated first semantic map in the memory for use in future missions of the mobile robot.

In Example 15, the subject matter of Example 14 optionally includes planning a path or navigating the mobile robot about the environment according to the updated first semantic map.

In Example 16, the subject matter of any one or more of Examples 14-15 optionally include steps of: transferring the first semantic annotations from the first semantic map to a second semantic map; and generating the second semantic annotations using the transferred first semantic annotations.

In Example 17, the subject matter of any one or more of Examples 14-16 optionally includes the user input that can include, via a user interface, one or more of selecting, deselecting, adding, deleting, translating, rotating, modifying, or labelling a semantic annotation from the first or the second semantic map.

In Example 18, the subject matter of any one or more of Examples 14-17 optionally includes steps of automatically modifying, via the mobile robot, the first or the second semantic annotations, and receiving a user input to accept or reject the automatic modification of the first or the second semantic annotations.

In Example 19, the subject matter of any one or more of Examples 14-18 optionally includes steps of: receiving from the user an identification of a semantic conflict between the first and the second semantic maps, or a user feedback on an automatically detected semantic conflict between the first and the second semantic maps; and receiving a user input for resolving the user-identified semantic conflict or the automatically detected semantic conflict, or a user input to reject updating the first semantic map if the user-identified semantic conflict or the automatically detected semantic conflict satisfies a condition.

In Example 20, the subject matter of any one or more of Examples 1-19 optionally include: receiving from a user an identification of a novel semantic object presented on the second semantic map and absent from the stored first semantic map, or a user feedback on an automatically detected novel semantic object; and including a supplemental semantic annotation for the novel semantic object into the second semantic map if the supplemental semantic annotation satisfies constraints relative to the second semantic annotations on the second semantic map.

This summary is an overview of some of the teachings of the present application and not intended to be an exclusive or exhaustive treatment of the present subject matter. Further details about the present subject matter are found in the detailed description and appended claims. Other aspects of the disclosure will be apparent to persons skilled in the art upon reading and understanding the following detailed description and viewing the drawings that form a part thereof, each of which are not to be taken in a limiting sense. The scope of the present disclosure is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIG. 4A is a diagram illustrating an example of a communication network in which a mobile cleaning robot operates and data transmission in the network.

DETAILED DESCRIPTION

Figure 1:
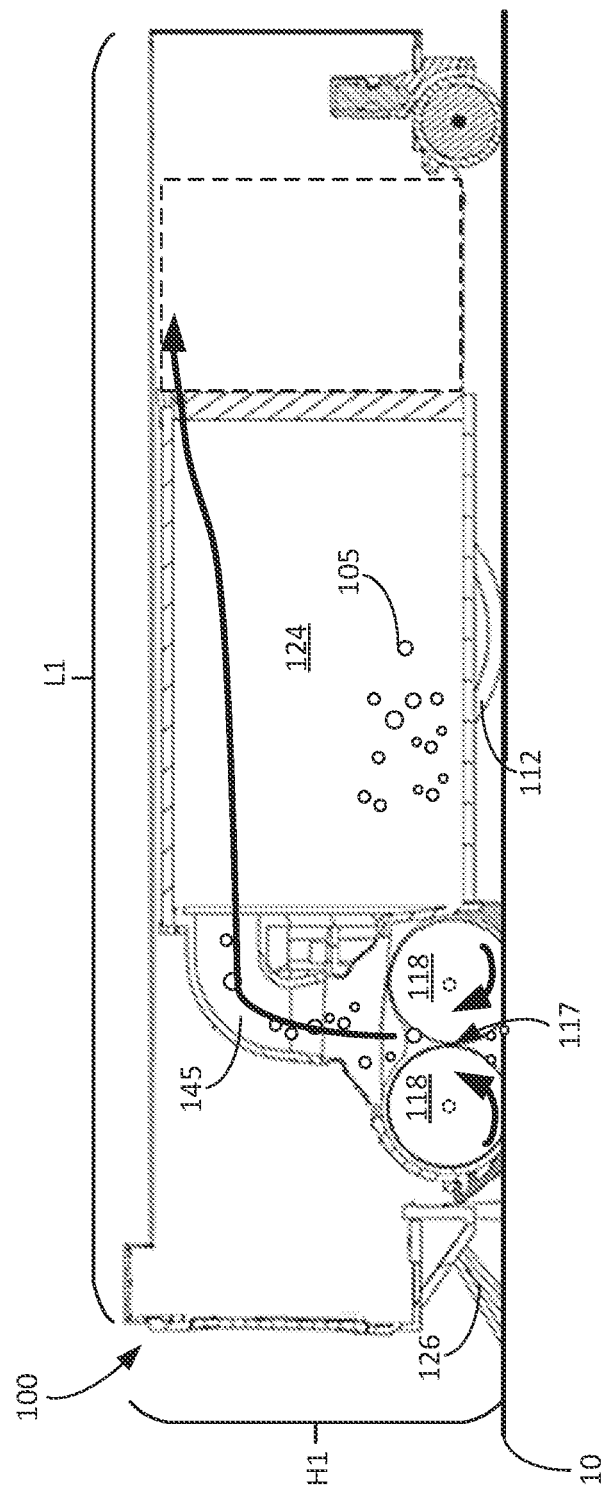
FIGS. 1, 2A, and 2B are side cross-sectional, bottom, and top perspective views of a mobile robot.

As a mobile robot explores its surroundings, it generates a map of an environment and uses the map for path planning and navigation. The raw robot map, such as an occupancy map, can be enriched with semantics. Semantics represent characteristics of objects in the environment, such as detected by the mobile robot. Examples of the semantics can include a location, an identity, or a state of an object in the environment, among other characteristics. By way of example and not limitations, rooms, doors, clutters, walls, fixtures, furniture, carpets, rugs, floor surfaces, and environmental properties such as wet or hazardous area are natural semantics recognizable by the mobile robot. Additionally, semantics may also include mutual constraints among the objects in the environment. The constraints represent how one object relates spatially to another object or to a region in the occupancy map. For example, a constraint for a door is that it divides two rooms.

The semantics, including the characteristics of individual objects and mutual constraints between objects or between an object and the occupancy map, can be annotated on the occupancy map automatically (e.g., using an algorithm) or manually (e.g., through a user input) to produce a semantic map. Semantic maps can provide a richer user experience in several ways. The semantic annotations on a semantic map can help the mobile robot and its users better understand the environment. The semantics are useful for improved visualization of an occupancy map in the user's context. The robot and user can communicate through the semantics, which forms a common frame of reference. With the established semantics, a mobile robot can be more efficient by incorporating them into its behavior. For instance, given an occupancy map that represents occupied and free space in a home, semantics such as room boundaries and doors can be attached to it. Compared to the occupancy map, the semantic map can represent a visualized floorplan of the home which users can understand easily. The user can intuitively communicate to the robot to perform a mission in a commonly understandable location (e.g., instructs the robot to "clean the kitchen."), and the robot would know where to go and what to do based on the semantic annotations. In some examples, the robot can perform a mission (e.g., cleaning or avoiding a room) by analyzing usage patterns, thus adding intelligence. Through better visualization of the map, intuitive robot-user communication, and intelligent robot behaviors, semantic maps can improve the robot's usability.

When a robot runs a new mission, it updates its internal map (e.g., the occupancy map) using recent information from its sensors. With a robot occupancy map update, semantic annotations on the previous semantic map (which corresponds to an earlier mission) can be transferred to a new semantic map corresponding to a new mission. Transfer accounts for maintaining previously established semantic annotations, such that the mobile robot can reuse at least some of those semantic annotations in a subsequent mission. After the transfer, it is desirable that the semantics retain their meaning and that the constraints between the semantics remain valid. However, in certain circumstances, some semantic annotations may be missing, or certain characteristics (e.g., size, shape, or location of an object) may be altered after semantic transfer, leading to invalid semantics. Semantics are deemed invalid if they are incorrectly represented in the new semantic map, or if constraints between the semantics are violated. Invalid semantics, if not corrected or resolved properly, may violate the assumption that the mobile robot and user share a common understanding of the environment. Consequently, the robot may behave differently from the user's expectation. For example, a transfer error may be represented by a room boundary smaller or larger, beyond an acceptable tolerance, than the semantic representation of the same room boundary in a previous semantic map. The robot would perform next mission (e.g., floor surface cleaning) in only a subset of a specified room or a different room than what it was instructed by the user.

The present inventors have recognized an unmet need for devices and methods for properly maintaining a semantic map in a mobile robot's lifetime. The present document discusses systems, devices, and methods for generating and managing a semantic map. According to one example, a mobile robot comprises control circuitry configured to perform various map maintenance tasks including map annotation, semantic transfer, conflict detection and resolution, semantic discovery of previously unexplored or undocumented semantics, and map update, among others. For example, upon detection of semantic conflicts such as due to transfer errors, said conflicts may be resolved through algorithms or user interaction. If resolution is not possible (e.g., due to constraints between semantic annotations), map update may be discarded or suspended, and the semantic map may revert to an earlier valid state. In some examples, new semantics may be discovered from the map corresponding to a new mission. For example, when the robot senses significant changes in the environment, there could be potential for discovering new semantics, and adding new semantic annotations to the semantic map. The semantic map management system as discussed herein can enable a mobile robot to continuously reason about the semantics in its world and reflect on changes in its environment to keep the map up to date.

In the following, mobile robot and its working environment are briefly discussed with reference to FIGS. 1-4. Detailed descriptions of systems, devices, and methods of generating and managing a semantic map, in accordance with various embodiments described herein, are discussed with reference to FIGS. 5-20.

Examples of Autonomous Mobile Robots

Figure 2A:
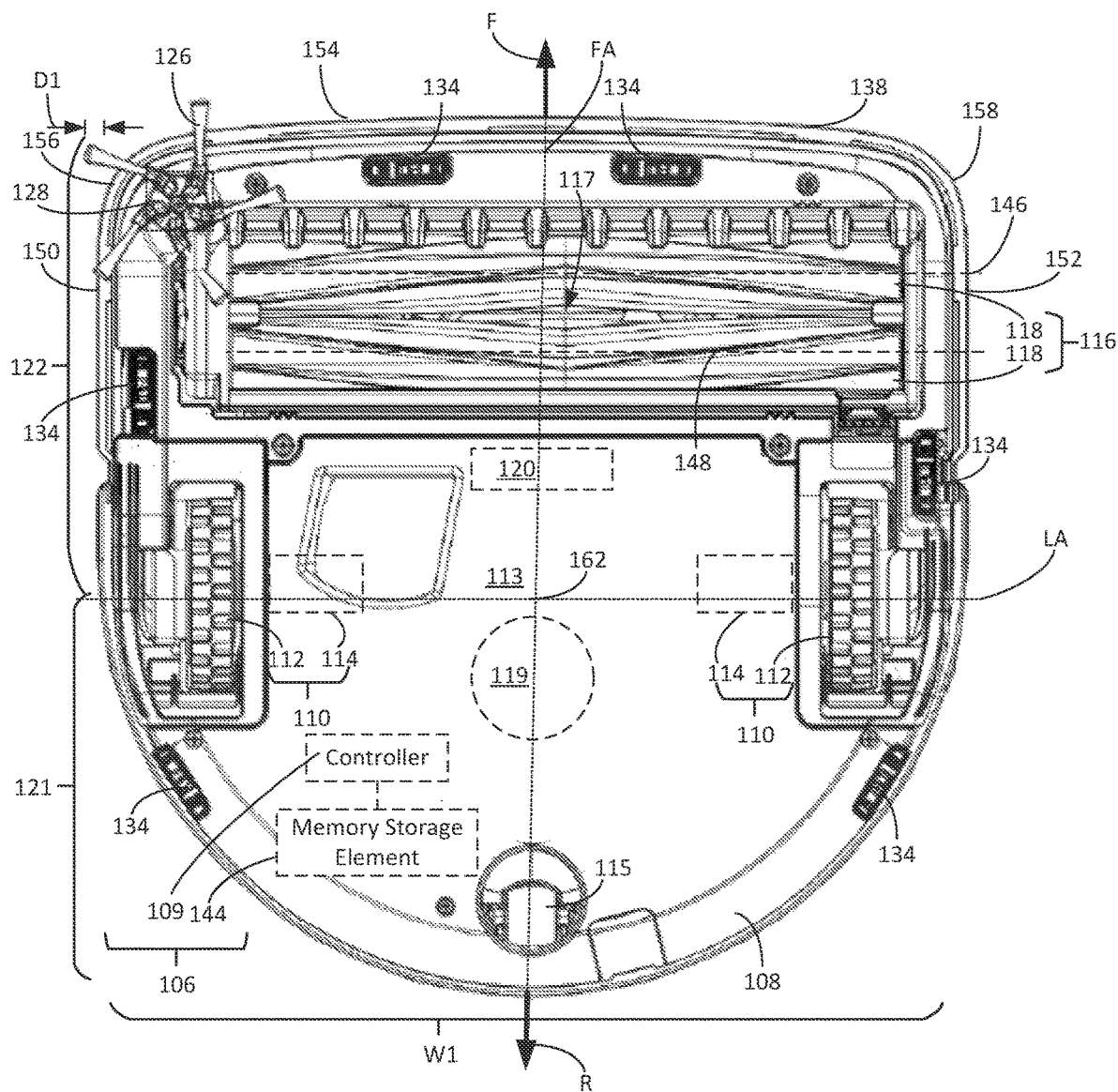
Figure 2B:
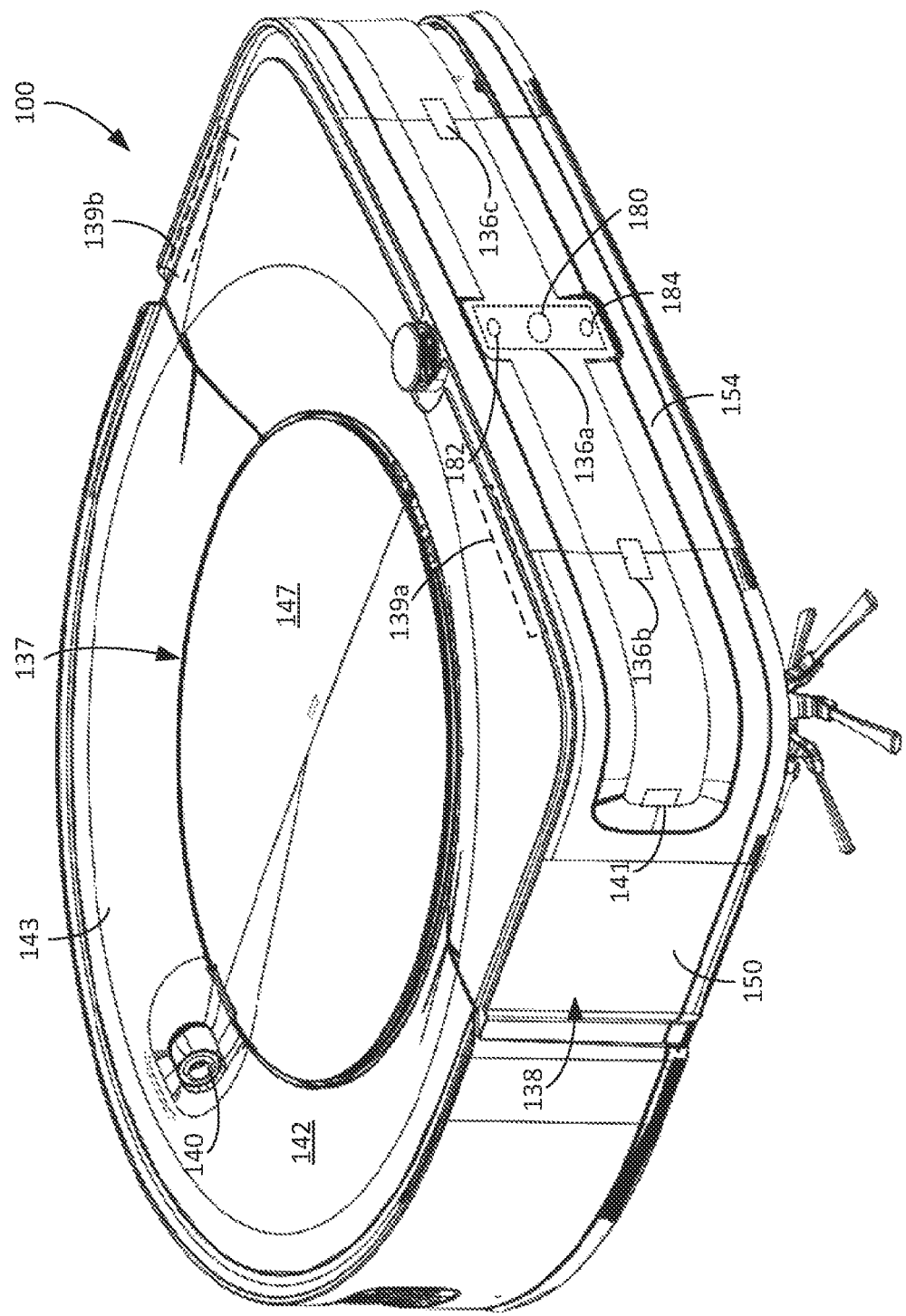

FIGS. 1 and 2A-2B depict different views of an example of a mobile floor-cleaning robot 100. Referring to FIG. 1, the robot 100 collects debris 105 from the floor surface 10 as the robot 100 traverses the floor surface 10. Referring to FIG. 2A, the robot 100 includes a robot housing infrastructure 108. The housing infrastructure 108 can define the structural periphery of the robot 100. In some examples, the housing infrastructure 108 includes a chassis, cover, bottom plate, and bumper assembly. The robot 100 is a household robot that has a small profile so that the robot 100 can fit under furniture within a home. For example, a height H1 (shown in FIG. 1) of the robot 100 relative to the floor surface is, for example, no more than 13 centimeters. The robot 100 is also compact. An overall length L1 (shown in FIG. 1) of the robot 100 and an overall width W1 (shown in FIG. 2A) are each between 30 and 60 centimeters, e.g., between 30 and 40 centimeters, 40 and 50 centimeters, or 50 and 60 centimeters. The overall width W1 can correspond to a width of the housing infrastructure 108 of the robot 100.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller circuit 109, within the robot 100.

The drive system 110 is operable to propel the robot 100 across the floor surface 10. The robot 100 can be propelled in a forward drive direction F or a rearward drive direction R. The robot 100 can also be propelled such that the robot 100 turns in place or turns while moving in the forward drive direction F or the rearward drive direction R. In the example depicted in FIG. 2A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Referring to FIG. 2B, the robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portions 122 connect the side surface 150, 152 to the forward surface 154.

In the example depicted in FIGS. 1 and 2A-2B, the robot 100 is an autonomous mobile floor cleaning robot that includes a cleaning head assembly 116 (shown in FIG. 2A) operable to clean the floor surface 10. For example, the robot 100 is a vacuum cleaning robot in which the cleaning head assembly 116 is operable to clean the floor surface 10 by ingesting debris 105 (shown in FIG. 1) from the floor surface 10. The cleaning head assembly 116 includes a cleaning inlet 117 through which debris is collected by the robot 100. The cleaning inlet 117 is positioned forward of a center of the robot 100, e.g., a center 162, and along the forward portion 122 of the robot 100 between the side surfaces 150, 152 of the forward portion 122.

The cleaning head assembly 116 includes one or more rotatable members, e.g., rotatable members 118 driven by a roller motor 120. The rotatable members 118 extend horizontally across the forward portion 122 of the robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the robot 100. Referring also to FIG. 1, the cleaning inlet 117 is positioned between the rotatable members 118.

As shown in FIG. 1, the rotatable members 118 are rollers that counter rotate relative to one another. For example, the rotatable members 118 can include a front roller and a rear roller mounted parallel to the floor surface and spaced apart from one another by a small elongated gap. The rotatable members 118 can be rotatable about parallel horizontal axes 146, 148 (shown in FIG. 2A) to agitate debris 105 on the floor surface 10 and direct the debris 105 toward the cleaning inlet 117, into the cleaning inlet 117, and into a suction pathway 145 (shown in FIG. 1) in the robot 100. Referring back to FIG. 2A, the rotatable members 118 can be positioned entirely within the forward portion 122 of the robot 100. The rotatable members 118 include elastomeric shells that contact debris 105 on the floor surface 10 to direct debris 105 through the cleaning inlet 117 between the rotatable members 118 and into an interior of the robot 100, e.g., into a debris bin 124 (shown in FIG. 1), as the rotatable members 118 rotate relative to the housing infrastructure 108. The rotatable members 118 further contact the floor surface 10 to agitate debris 105 on the floor surface 10. In the example as illustrated in FIG. 2A, the rotatable members 118, such as front and rear rollers, may each feature a pattern of chevron-shaped vanes distributed along its cylindrical exterior, and the vanes of at least one roller make contact with the floor surface along the length of the roller and experience a consistently applied friction force during rotation that is not present with brushes having pliable bristles.

The rotatable members 118 may take other suitable configurations. In an example, at least one of the front and rear rollers may include bristles and/or elongated pliable flaps for agitating the floor surface. In an example, a flapper brush, rotatably coupled to the cleaning head assembly housing, can include a compliant flap extending radially outward from the core to sweep a floor surface as the roller is driven to rotate. The flap is configured to prevent errant filaments from spooling tightly about the core to aid subsequent removal of the filaments. The flapper brush includes axial end guards mounted on the core adjacent the ends of the outer core surface and configured to prevent spooled filaments from traversing axially from the outer core surface onto the mounting features. The flapper brush can include multiple floor cleaning bristles extending radially outward from the core.

The robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning head assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The robot 100 further includes a brush 126 (also referred to as a side brush) that rotates about a non-horizontal axis. e.g., an axis forming an angle between 75 degrees and 90 degrees with the floor surface 10. The non-horizontal axis, for example, forms an angle between 75 degrees and 90 degrees with the longitudinal axes of the rotatable members 118. The robot 100 includes a brush motor 128 operably connected to the side brush 126 to rotate the side brush 126.

The brush 126 is a side brush laterally offset from a fore-aft axis FA of the robot 100 such that the brush 126 extends beyond an outer perimeter of the housing infrastructure 108 of the robot 100. For example, the brush 126 can extend beyond one of the side surfaces 150, 152 of the robot 100 and can thereby be capable of engaging debris on portions of the floor surface 10 that the rotatable members 118 typically cannot reach, e.g., portions of the floor surface 10 outside of a portion of the floor surface 10 directly underneath the robot 100. The brush 126 is also forwardly offset from a lateral axis LA of the robot 100 such that the brush 126 also extends beyond the forward surface 154 of the housing infrastructure 108. As depicted in FIG. 2A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters. e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning head assembly 116 as the robot 100 moves. For example, in examples in which the robot 100 is moving in the forward drive direction F, the brush 126 is rotatable in a clockwise direction (when viewed from a perspective above the robot 100) such that debris that the brush 126 contacts moves toward the cleaning head assembly and toward a portion of the floor surface 10 in front of the cleaning head assembly 116 in the forward drive direction F. As a result, as the robot 100 moves in the forward drive direction F, the cleaning inlet 117 of the robot 100 can collect the debris swept by the brush 126. In examples in which the robot 100 is moving in the rearward drive direction R, the brush 126 is rotatable in a counterclockwise direction (when viewed from a perspective above the robot 100) such that debris that the brush 126 contacts moves toward a portion of the floor surface 10 behind the cleaning head assembly 116 in the rearward drive direction R. As a result, as the robot 100 moves in the rearward drive direction R, the cleaning inlet 117 of the robot 100 can collect the debris swept by the brush 126.

The electrical circuitry 106 includes, in addition to the controller circuit 109, a memory storage element 144 and a sensor system with one or more electrical sensors, for example. The sensor system, as described herein, can generate a signal indicative of a current location of the robot 100, and can generate signals indicative of locations of the robot 100 as the robot 100 travels along the floor surface 10. The controller circuit 109 is configured to execute instructions to perform one or more operations as described herein. The memory storage element 144 is accessible by the controller circuit 109 and disposed within the housing infrastructure 108. The one or more electrical sensors are configured to detect features in an environment of the robot 100. For example, referring to FIG. 2A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the robot 100 where the cliff sensors 134 are disposed and redirect the robot accordingly. More details of the sensor system and the controller circuit 109 are discussed below, such as with reference to FIG. 3.

Referring to FIG. 2B, the sensor system includes one or more proximity sensors that can detect objects along the floor surface 10 that are near the robot 100. For example, the sensor system can include proximity sensors 136a. 136b, 136c disposed proximate the forward surface 154 of the housing infrastructure 108. Each of the proximity sensors 136a. 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment of the robot 100.

The sensor system includes a bumper system including the bumper 138 and one or more bump sensors that detect contact between the bumper 138 and obstacles in the environment. The bumper 138 forms part of the housing infrastructure 108. For example, the bumper 138 can form the side surfaces 150, 152 as well as the forward surface 154. The sensor system, for example, can include the bump sensors 139a. 139b. The bump sensors 139a. 139b can include break beam sensors, capacitive sensors, or other sensors that can detect contact between the robot 100, e.g., the bumper 138, and objects in the environment. In some implementations, the bump sensor 139a can be used to detect movement of the bumper 138 along the fore-aft axis FA (shown in FIG. 2A) of the robot 100, and the bump sensor 139b can be used to detect movement of the bumper 138 along the lateral axis LA (shown in FIG. 2A) of the robot 100. The proximity sensors 136a, 136b, 136c can detect objects before the robot 100 contacts the objects, and the bump sensors 139a. 139b can detect objects that contact the bumper 138. e.g., in response to the robot 100 contacting the objects.

The sensor system includes one or more obstacle following sensors. For example, the robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the robot 100 and perpendicular to the side surface 150 of the robot 100. For example, the detectable objects include obstacles such as furniture, walls, persons, and other objects in the environment of the robot 100. In some implementations, the sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In this regard, the left obstacle following can be used to determine a distance between an object, e.g., an obstacle surface, to the left of the robot 100 and the robot 100, and the right obstacle following sensor can be used to determine a distance between an object, e.g., an obstacle surface, to the right of the robot 100 and the robot 100.

In some implementations, at least some of the proximity sensors 136a, 136b. 136c, and the obstacle following sensor 141 each includes an optical emitter and an optical detector. The optical emitter emits an optical beam outward from the robot 100, e.g., outward in a horizontal direction, and the optical detector detects a reflection of the optical beam that reflects off an object near the robot 100. The robot 100. e.g., using the controller circuit 109, can determine a time of flight of the optical beam and thereby determine a distance between the optical detector and the object, and hence a distance between the robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the robot 100. In some implementations, the optical emitters 182, 184 each emit a fan of beams outward toward an obstacle surface such that a one-dimensional grid of dots appear on one or more obstacle surfaces. The one-dimensional grid of dots can be positioned on a horizontally extending line. In some implementations, the grid of dots can extend across multiple obstacle surfaces, e.g., multiple obstacle surfaces adjacent to one another. The optical detector 180 can capture an image representative of the grid of dots formed by the optical emitter 182 and the grid of dots formed by the optical emitter 184. Based on a size of a dot in the image, the robot 100 can determine a distance of an object on which the dot appears relative to the optical detector 180. e.g., relative to the robot 100. The robot 100 can make this determination for each of the dots, thus allowing the robot 100 to determine a shape of an object on which the dots appear. In addition, if multiple objects are ahead of the robot 100, the robot 100 can determine a shape of each of the objects. In some implementations, the objects can include one or more objects that are laterally offset from a portion of the floor surface 10 directly in front of the robot 100.

The sensor system further includes an image capture device 140, e.g., a camera, directed toward a top portion 142 of the housing infrastructure 108. The image capture device 140 generates digital imagery of the environment of the robot 100 as the robot 100 moves about the floor surface 10. The image capture device 140 is angled in an upward direction. e.g., angled between 30 degrees and 80 degrees from the floor surface 10 about which the robot 100 navigates. The camera, when angled upward, is able to capture images of wall surfaces of the environment so that features corresponding to objects on the wall surfaces can be used for localization.

When the controller circuit 109 causes the robot 100 to perform the mission, the controller circuit 109 operates the motors 114 to drive the drive wheels 112 and propel the robot 100 along the floor surface 10. In addition, the controller circuit 109 operates the roller motor 120 to cause the rotatable members 118 to rotate, operates the brush motor 128 to cause the side brush 126 to rotate, and operates the motor of the vacuum system 119 to generate the airflow. To cause the robot 100 to perform various navigational and cleaning behaviors, the controller circuit 109 executes software stored on the memory storage element 144 to cause the robot 100 to perform by operating the various motors of the robot 100. The controller circuit 109 operates the various motors of the robot 100 to cause the robot 100 to perform the behaviors.

The sensor system can further include sensors for tracking a distance travelled by the robot 100. For example, the sensor system can include encoders associated with the motors 114 for the drive wheels 112, and these encoders can track a distance that the robot 100 has travelled. In some implementations, the sensor system includes an optical sensor facing downward toward a floor surface. The optical sensor can be an optical mouse sensor. For example, the optical sensor can be positioned to direct light through a bottom surface of the robot 100 toward the floor surface 10. The optical sensor can detect reflections of the light and can detect a distance travelled by the robot 100 based on changes in floor features as the robot 100 travels along the floor surface 10.

The controller circuit 109 uses data collected by the sensors of the sensor system to control navigational behaviors of the robot 100 during the mission. For example, the controller circuit 109 uses the sensor data collected by obstacle detection sensors of the robot 100, e.g., the cliff sensors 134, the proximity sensors 136a, 136b, 136c, and the bump sensors 139a. 139b, to enable the robot 100 to avoid obstacles or to prevent from falling down stairs within the environment of the robot 100 during the mission. In some examples, the controller circuit 109 controls the navigational behavior of the robot 100 using information about the environment, such as a map of the environment. With proper navigation, the robot 100 is able to reach a goal position or completes a coverage mission as efficiently and as reliably as possible.

The sensor data can be used by the controller circuit 109 for simultaneous localization and mapping (SLAM) techniques in which the controller circuit 109 extracts features of the environment represented by the sensor data and constructs a map of the floor surface 10 of the environment. The sensor data collected by the image capture device 140 can be used for techniques such as vision-based SLAM (VSLAM) in which the controller circuit 109 extracts visual features corresponding to objects in the environment and constructs the map using these visual features. As the controller circuit 109 directs the robot 100 about the floor surface 10 during the mission, the controller circuit 109 uses SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the robot 100 to perform its behaviors, the memory storage element 144 stores sensor data or data resulting from processing of the sensor data for access by the controller circuit 109 from one mission to another mission. For example, the map can be a persistent map that is usable and updateable by the controller circuit 109 of the robot 100 from one mission to another mission to navigate the robot 100 about the floor surface 10. According to various embodiments discussed in this document, the persistent map can be updated in response to instruction commands received from a user. The controller circuit 109 can modify subsequent or future navigational behaviors of the robot 100 according to the updated persistent map, such as by modifying the planned path or updating obstacle avoidance strategy.

The persistent data, including the persistent map, enables the robot 100 to efficiently clean the floor surface 10. For example, the persistent map enables the controller circuit 109 to direct the robot 100 toward open floor space and to avoid nontraversable space. In addition, for subsequent missions, the controller circuit 109 is able to plan navigation of the robot 100 through the environment using the persistent map to optimize paths taken during the missions.

The robot 100 can, in some implementations, include a light indicator system 137 located on the top portion 142 of the robot 100. The light indicator system 137 can include light sources positioned within a lid 147 covering the debris bin 124 (shown in FIG. 2A). The light sources can be positioned to direct light to a periphery of the lid 147. The light sources are positioned such that any portion of a continuous loop 143 on the top portion 142 of the robot 100 can be illuminated. The continuous loop 143 is located on a recessed portion of the top portion 142 of the robot 100 such that the light sources can illuminate a surface of the robot 100 as they are activated.

Figure 3:
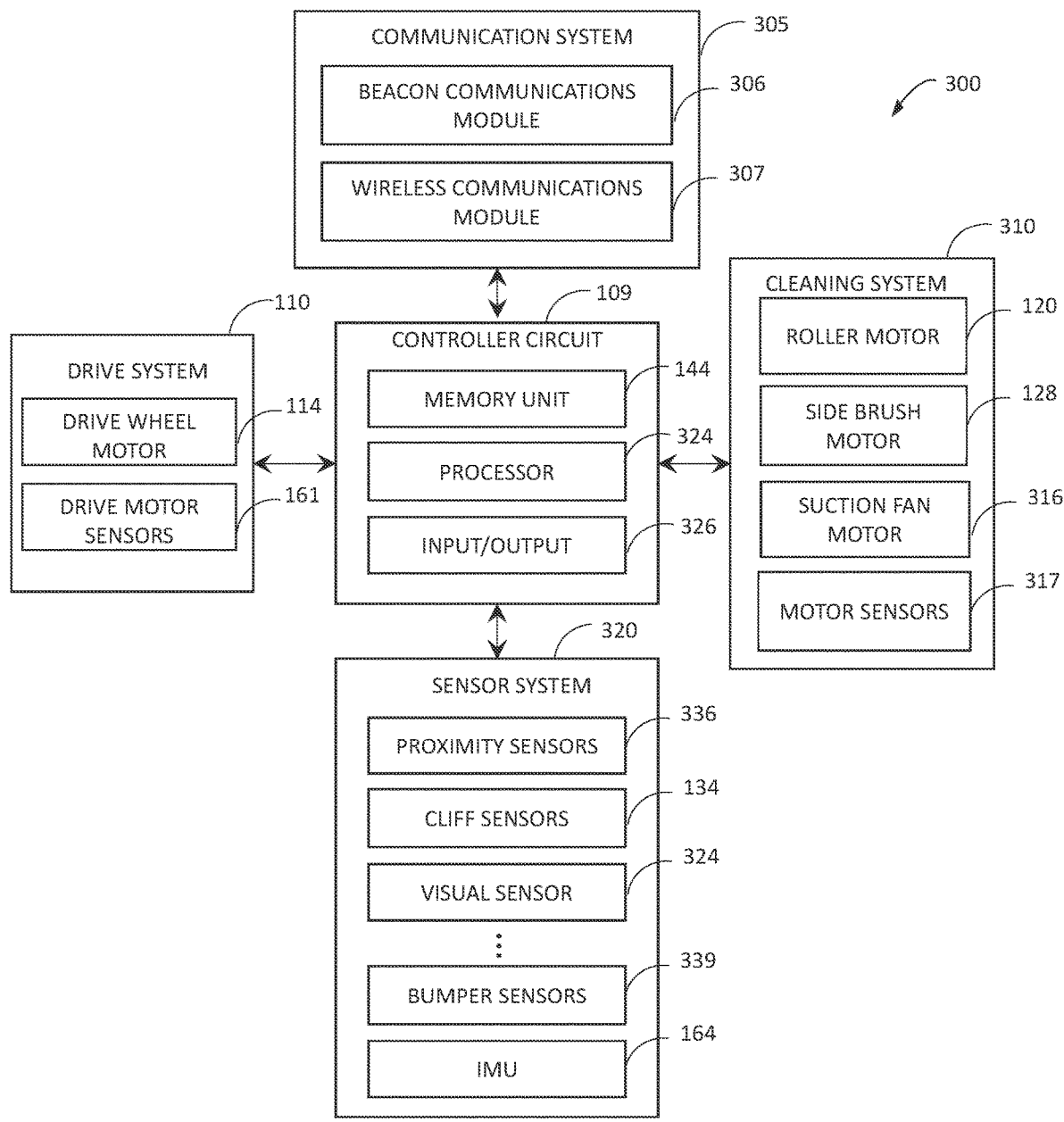
FIG. 3 is a diagram illustrating an example of a control architecture for operating a mobile cleaning robot.

FIG. 3 is a diagram illustrating an example of a control architecture 300 for operating a mobile cleaning robot. The controller circuit 109 can be communicatively coupled to various subsystems of the robot 100, including a communications system 305, a cleaning system 310, a drive system 110, and a navigation sensor system 320. The controller circuit 109 includes a memory unit 144 that holds data and instructions for processing by a processor 324. The processor 324 receives program instructions and feedback data from the memory unit 144, executes logical operations called for by the program instructions, and generates command signals for operating the respective subsystem components of the robot 100. An input/output unit 326 transmits the command signals and receives feedback from the various illustrated components.

The communications system 305 can include a beacon communications module 306 and a wireless communications module 307. The beacon communications module 306 may be communicatively coupled to the controller circuit 109. In some embodiments, the beacon communications module 306 is operable to send and receive signals to and from a remote device. For example, the beacon communications module 306 may detect a navigation signal projected from an emitter of a navigation or virtual wall beacon or a homing signal projected from the emitter of a docking station. Docking, confinement, home base, and homing technologies are discussed in U.S. Pat. Nos. 7,196,487 and 7,404,000, U.S. Patent Application Publication No. 20050156562, and U.S. Patent Application Publication No. 20140100693 (the entireties of which are hereby incorporated by reference). As described in U.S. Patent Publication 2014/0207282 (the entirety of which is hereby incorporated by reference), the wireless communications module 307 facilitates the communication of information describing a status of the robot 100 over a suitable wireless network (e.g., a wireless local area network) with one or more mobile devices (e.g., mobile device 404 shown in FIG. 4A). More details of the communications system 305 are discussed below, such as with reference to FIG. 4A.

The cleaning system 310 can include the roller motor 120, a brush motor 128 driving the side brush 126, and a suction fan motor 316 powering the vacuum system 119. The cleaning system 310 further includes multiple motor sensors 317 that monitor operation of the roller motor 120, the brush motor 128, and the suction fan motor 316 to facilitate closed-loop control of the motors by the controller circuit 109. In some embodiments, the roller motor 120 is operated by the controller circuit 109 (or a suitable microcontroller) to drive the rollers (e.g., rotatable members 118) according to a particular speed setting via a closed-loop pulse-width modulation (PWM) technique, where the feedback signal is received from a motor sensor 317 monitoring a signal indicative of the rotational speed of the roller motor 120. For example, such a motor sensor 317 may be provided in the form of a motor current sensor (e.g., a shunt resistor, a current-sensing transformer, and/or a Hall Effect current sensor).

The drive system 110 can include a drive-wheel motor 114 for operating the drive wheels 112 in response to drive commands or control signals from the controller circuit 109, as well as multiple drive motor sensors 161 to facilitate closed-loop control of the drive wheels (e.g., via a suitable PWM technique as described above). In some implementations, a microcontroller assigned to the drive system 110 is configured to decipher drive commands having x, y, and θ components. The controller circuit 109 may issue individual control signals to the drive wheel motor 114. In any event, the controller circuit 109 can maneuver the robot 100 in any direction across a cleaning surface by independently controlling the rotational speed and direction of each drive wheel 112 via the drive-wheel motor 114.

The controller circuit 109 can operate the drive system 110 in response to signals received from the navigation sensor system 320. For example, the controller circuit 109 may operate the drive system 110 to redirect the robot 100 to avoid obstacles and clutter encountered while treating a floor surface. In another example, if the robot 100 becomes stuck or entangled during use, the controller circuit 109 may operate the drive system 110 according to one or more escape behaviors. To achieve reliable autonomous movement, the navigation sensor system 320 may include several different types of sensors that can be used in combination with one another to allow the robot 100 to make intelligent decisions about a particular environment. By way of example and not limitation, the navigation sensor system 320 can include one or more of proximity sensors 336 (such as the proximity sensors 136a-136c), the cliff sensors 134, a visual sensor 324 such as the image capture device 140 configured for detecting features and landmarks in the operating environment and building a virtual map, such as using VSLAM technology, as described above.

The navigation sensor system 320 may further include bumper sensors 339 (such as the bumper sensors 139a and 139b), responsive to activation of the bumper 138. The sensor system 320 can include an inertial measurement unit (IMU) 164 that is, in part, responsive to changes in position of the robot 100 with respect to a vertical axis substantially perpendicular to the floor and senses when the robot 100 is pitched at a floor type interface having a difference in height, which is potentially attributable to a flooring type change. In some examples, the IMU 164 is a six-axis IMU having a gyro sensor that measures the angular velocity of the robot 100 relative to the vertical axis. However, other suitable configurations are also contemplated. For example, the IMU 164 may include an accelerometer sensitive to the linear acceleration of the robot 100 along the vertical axis. In any event, output from the IMU 164 is received by the controller circuit 109 and processed to detect a discontinuity in the floor surface across which the robot 100 is traveling. Within the context of the present disclosure the terms "flooring discontinuity" and "threshold" refer to any irregularity in the floor surface (e.g., a change in flooring type or change in elevation at a flooring interface) that is traversable by the robot 100, but that causes a discrete vertical movement event (e.g., an upward or downward "bump"). The vertical movement event could refer to a part of the drive system (e.g., one of the drive wheels 112) or the chassis of the robot housing 108, depending on the configuration and placement of the IMU 164. Detection of a flooring threshold, or flooring interface, may prompt the controller circuit 109 to expect a change in floor type. For example, the robot 100 may experience a significant downward vertical bump as it moves from high pile carpet (a soft floor surface) to a tile floor (a hard floor surface), and an upward bump in the opposite case.

A wide variety of other types of sensors, though not shown or described in connection with the illustrated examples, may be incorporated in the navigation sensor system 320 (or any other subsystem) without departing from the scope of the present disclosure. Such sensors may function as obstacle detection units, obstacle detection obstacle avoidance (ODOA) sensors, wheel drop sensors, obstacle-following sensors, stall-sensor units, drive-wheel encoder units, bumper sensors, and the like.

Examples of Communication Networks

FIG. 4A is a diagram illustrating by way of example and not limitation a communication network that enables networking between the mobile robot 100 and one or more other devices, such as a mobile device 404, a cloud computing system 406, or another autonomous robot 408 separate from the mobile robot 404. Using the communication network 410, the robot 100, the mobile device 404, the robot 408, and the cloud computing system 406 can communicate with one another to transmit data to one another and receive data from one another. In some implementations, the robot 100, the robot 408, or both the robot 100 and the robot 408 communicate with the mobile device 404 through the cloud computing system 406. Alternatively or additionally, the robot 100, the robot 408, or both the robot 100 and the robot 408 communicate directly with the mobile device 404. Various types and combinations of wireless networks (e.g., Bluetooth, radio frequency, optical based, etc.) and network architectures (e.g., mesh networks) may be employed by the communication network 410.

In some implementations, the mobile device 404 as shown in FIG. 4A is a remote device that can be linked to the cloud computing system 406, and can enable a user to provide inputs on the mobile device 404. The mobile device 404 can include user input elements such as, for example, one or more of a touchscreen display, buttons, a microphone, a mouse, a keyboard, or other devices that respond to inputs provided by the user. The mobile device 404 alternatively or additionally includes immersive media (e.g., virtual reality) with which the user interacts to provide a user input. The mobile device 404, in these cases, is, for example, a virtual reality headset or a head-mounted display. The user can provide inputs corresponding to commands for the mobile robot 404. In such cases, the mobile device 404 transmits a signal to the cloud computing system 406 to cause the cloud computing system 406 to transmit a command signal to the mobile robot 100. In some implementations, the mobile device 404 can present augmented reality images. In some implementations, the mobile device 404 is a smart phone, a laptop computer, a tablet computing device, or other mobile device.

According to various embodiments discussed herein, the mobile device 404 may include a user interface configured to display a map of the robot environment. Robot path, such as that identified by the coverage planner of the controller circuit 109, may also be displayed on the map. The interface may receive a user instruction to modify the environment map, such as by adding, removing, or otherwise modifying a keep-out traversable zone in the environment; adding, removing, or otherwise modifying a duplicate traversal zone in the environment (such as an area that requires repeated cleaning); restricting a robot traversal direction or traversal pattern in a portion of the environment; or adding or changing a cleaning rank, among others.

In some implementations, the communication network 410 can include additional nodes. For example, nodes of the communication network 410 can include additional robots. Alternatively or additionally, nodes of the communication network 410 can include network-connected devices. In some implementations, a network-connected device can generate information about the environment 20. The network-connected device can include one or more sensors to detect features in the environment 20, such as an acoustic sensor, an image capture system, or other sensor generating signals from which features can be extracted. Network-connected devices can include home cameras, smart sensors, and the like.

In the communication network 410 depicted in FIG. 4A and in other implementations of the communication network 410, the wireless links may utilize various communication schemes, protocols, etc., such as, for example. Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Figure 4B:
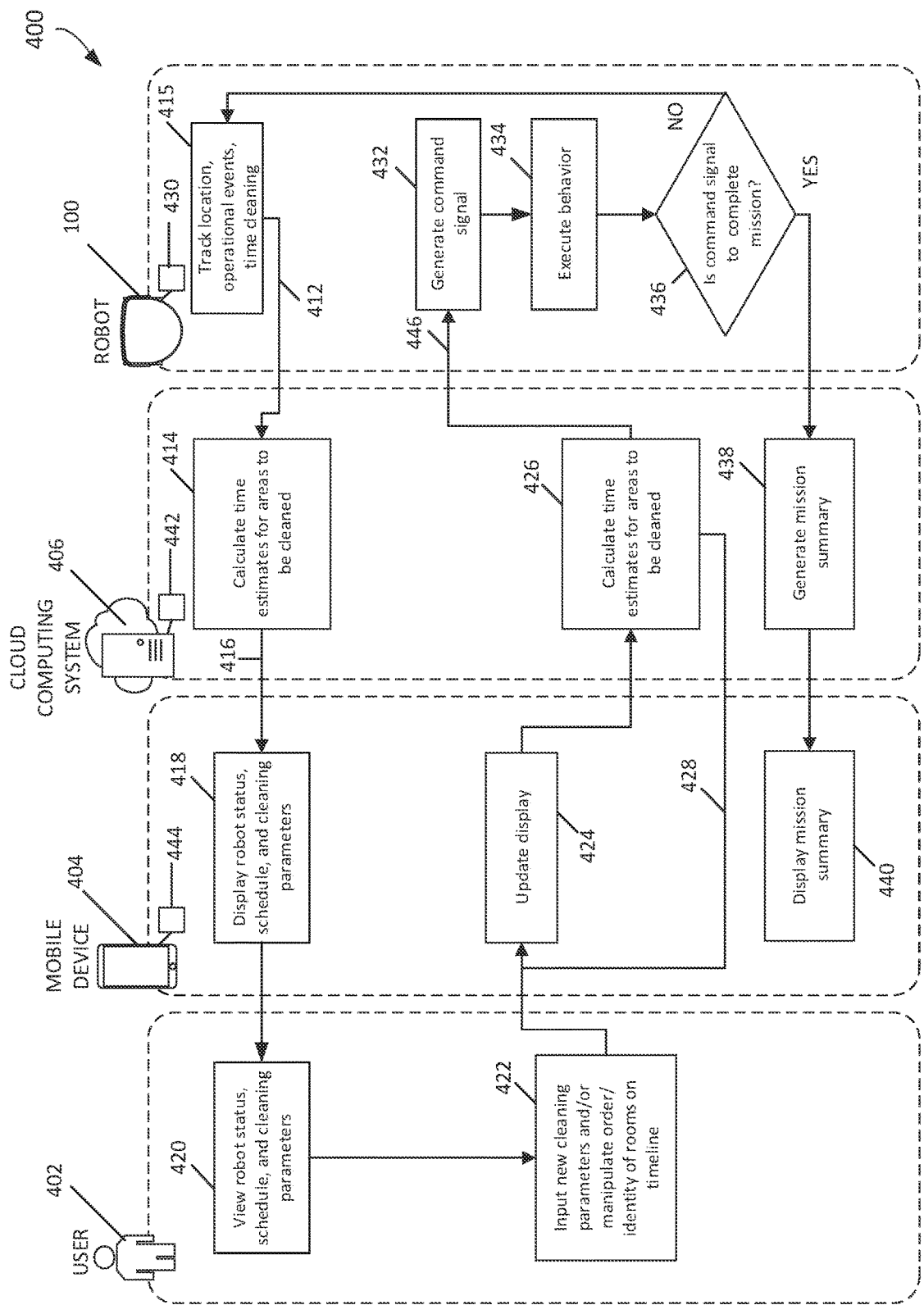
FIG. 4B is a diagram illustrating an exemplary process of exchanging information between the mobile robot and other devices in a communication network.

FIG. 4B is a diagram illustrating an exemplary process 400 of exchanging information among devices in the communication network 410, including the mobile robot 100, the cloud computing system 406, and the mobile device 404. A cleaning mission may be initiated by pressing a button on the mobile robot 100 or may be scheduled for a future time or day. The user may select a set of rooms to be cleaned during the cleaning mission or may instruct the robot to clean all rooms. The user may also select a set of cleaning parameters to be used in each room during the cleaning mission.

During a cleaning mission, the mobile robot 100 tracks 415 its status, including its location, any operational events occurring during cleaning, and a time spent cleaning. The mobile robot 100 transmits 412 status data (e.g. one or more of location data, operational event data, time data) to a cloud computing system 406, which calculates 414, by a processor 442, time estimates for areas to be cleaned. For example, a time estimate could be calculated for a cleaning room by averaging the actual cleaning times for the room that have been gathered during multiple (e.g. two or more) prior cleaning missions for the room. The cloud computing system 406 transmits 416 time estimate data along with robot status data to a mobile device 404. The mobile device 404 presents 418, by a processor 444, the robot status data and time estimate data on a display. The robot status data and time estimate data may be presented on the display of the mobile device as any of a number of graphical representations editable mission timeline and/or a mapping interface. In some examples, the mobile robot 100 can communicate directly with the mobile device 404.

A user 402 views 420 the robot status data and time estimate data on the display and may input 422 new cleaning parameters or may manipulate the order or identity of rooms to be cleaned. The user 402, may, for example, delete rooms from a cleaning schedule of the mobile robot 100. In other instances, the user 402, may, for example, select an edge cleaning mode or a deep cleaning mode for a room to be cleaned. The display of the mobile device 404 is updates 424 as the user inputs changes to the cleaning parameters or cleaning schedule. For example, if the user changes the cleaning parameters from single pass cleaning to dual pass cleaning, the system will update the estimated time to provide an estimate based on the new parameters. In this example of single pass cleaning vs. dual pass cleaning, the estimate would be approximately doubled. In another example, if the user removes a room from the cleaning schedule, the total time estimate is decreased by approximately the time needed to clean the removed room. Based on the inputs from the user 402, the cloud computing system 406 calculates 426 time estimates for areas to be cleaned, which are then transmitted 428 (e.g. by a wireless transmission, by applying a protocol, by broadcasting a wireless transmission) back to the mobile device 404 and displayed. Additionally, data relating to the calculated 426 time estimates are transmitted 446 to a controller 430 of the robot. Based on the inputs from the user 402, which are received by the controller 430 of the mobile robot 100, the controller 430 generates 432 a command signal. The command signal commands the mobile robot 100 to execute 434 a behavior, which may be a cleaning behavior. As the cleaning behavior is executed, the controller continues to track 415 the robot's status, including its location, any operational events occurring during cleaning, and a time spent cleaning. In some instances, live updates relating to the robot's status may be additionally provided via push notifications to a mobile device or home electronic system (e.g. an interactive speaker system).

Upon executing 434 a behavior, the controller 430 checks 436 to see if the received command signal includes a command to complete the cleaning mission. If the command signal includes a command to complete the cleaning mission, the robot is commanded to return to its dock and upon return sends information to enable the cloud computing system 406 to generate 438 a mission summary which is transmitted to, and displayed 440 by, the mobile device 404. The mission summary may include a timeline and/or a map. The timeline may display, the rooms cleaned, a time spent cleaning each room, operational events tracked in each room, etc. The map may display the rooms cleaned, operational events tracked in each room, a type of cleaning (e.g. sweeping or mopping) performed in each room, etc.

Operations for the process 400 and other processes described herein can be executed in a distributed manner. For example, the cloud computing system 406, the mobile robot 100, and the mobile device 404 may execute one or more of the operations in concert with one another. Operations described as executed by one of the cloud computing system 406, the mobile robot 100, and the mobile device 404 are, in some implementations, executed at least in part by two or all of the cloud computing system 406, the mobile robot 100, and the mobile device 404.

Examples of Semantic Map Management System

Various embodiments of systems, devices, and processes of generating and managing a semantic map for a motor robot are discussed in the following with reference to FIGS. 5-20. While this document makes reference to the mobile robot 100 that performs floor cleaning, the semantic map management system and methods discussed herein can be used in robots designed for different applications, such as mopping, mowing, transporting, surveillance, among others. Additionally, while some components, modules, and operations may be described as being implemented in and performed by the robot 100, by a user, by a computing device, or by another actor, these operations may, in some implementations, be performed by actors other than those described. For example, an operation performed by the robot 100 can be, in some implementations, performed by the cloud computing system 406 or by another computing device (or devices). In other examples, an operation performed by the user can be performed by a computing device. In some implementations, the cloud computing system 406 does not perform any operations. Rather, other computing devices perform the operations described as being performed by the cloud computing system 406, and these computing devices can be in direct (or indirect) communication with one another and the robot 100. In some implementations, the robot 100 can perform, in addition to the operations described as being performed by the robot 100, the operations described as being performed by the cloud computing system 406 or the mobile device 404. Other variations are possible. Furthermore, while the methods and processes described herein are described as including certain operations or sub-operations, in other implementations, one or more of these operation or sub-operations may be omitted, or additional operations or sub-operations may be added.

Figure 5:
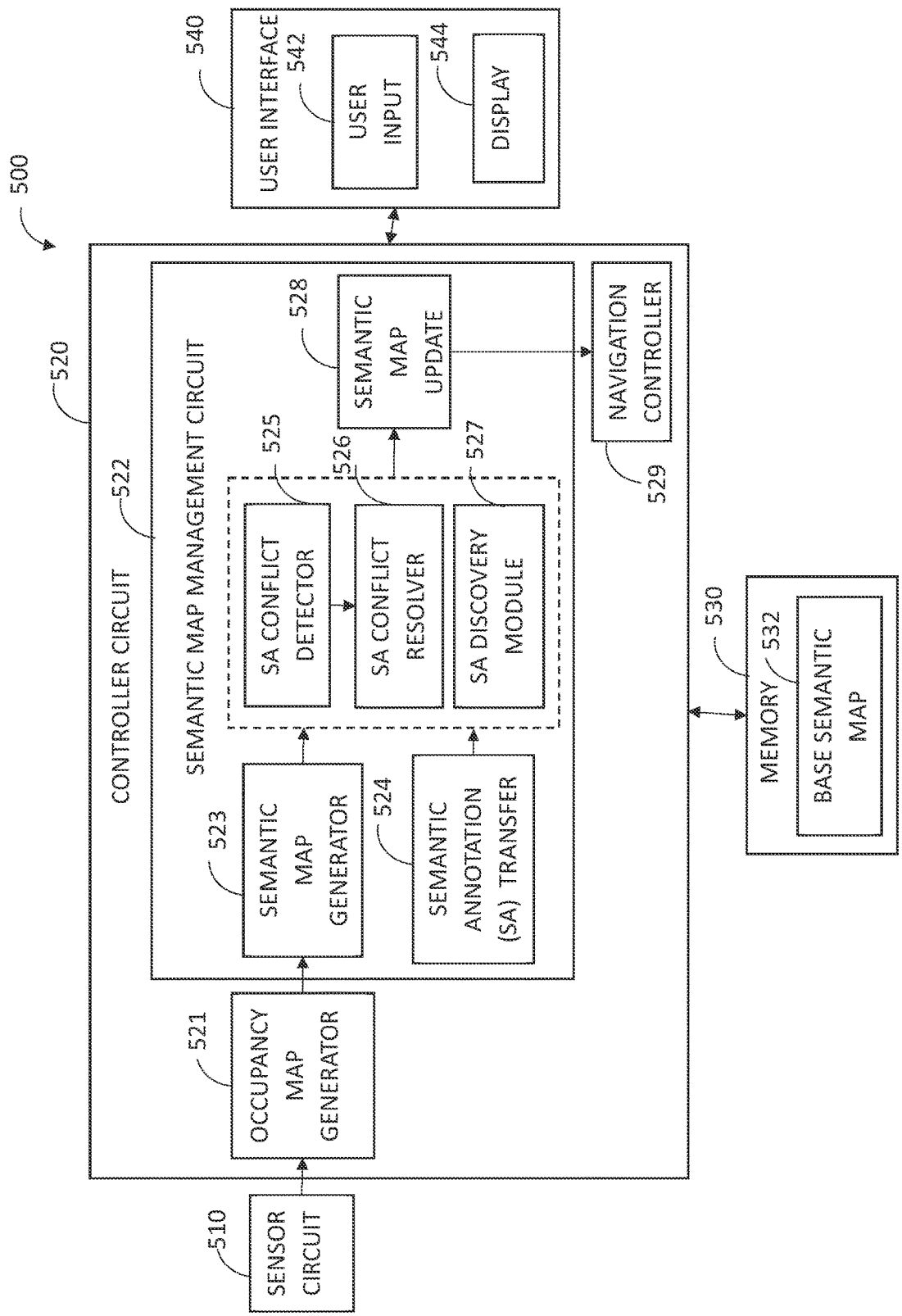
FIG. 5 is a block diagram illustrating an example of a semantic map management system.

FIG. 5 is a diagram illustrating an example of a semantic map management system 500 configured to generate and manage a semantic map for use by a mobile robot, such as the mobile robot 100. In this document, "management" or "maintenance" or a semantic map refer to operations performed on a semantic map, through algorithms or user input, to keep a valid semantic map reusable from one mission to another. The system 500 can include one or more of a sensor circuit 510, a controller circuit 520, a memory circuit 530, and a user interface 540. These components can perform semantic map generation and management operations including map annotation and editing, semantic transfer, conflict detection, conflict resolution, semantic discovery, or semantic map update.

At least a portion of the system 500 can be implemented in one or more of the mobile robot 100, the mobile device 404, the autonomous robot 408, or the cloud computing system 406. In an example, some or all of the system 500 can be implemented in the mobile robot 100, wherein, referring to FIG. 3, the sensor circuit 510 can be a part of the input/output unit 326 coupled to the sensor system 320 to receive sensor data corresponding to a mission of the mobile robot in the environment, the controller circuit 520 can be a part of the processor 324, and the memory circuit 530 can be a part of the memory unit 144 in the mobile robot 100. In another example, some or all of the system 500 can be implemented in a device separate from the mobile robot 100, such as a mobile device 404 (e.g., a smart phone or other computing device) communicatively coupled to the mobile robot 100, wherein the sensor circuit 510 can receive robot data from the mobile robot 100 via a communication link. The memory circuit 530 can store a semantic map of the environment corresponding to a mission of the mobile robot. The controller circuit 520 can execute computer-readable instructions (e.g., an application, or "app", on the smart phone) to perform various semantic map generation and management operations, such as map annotation and editing, semantic transfer, conflict detection and resolution, semantic discovery, or semantic map update, among other robot control operations.

The sensor circuit 510 can sense occupancy information of the environment corresponding to a mission of the mobile robot. The sensor circuit 510 can include one or more optical sensors, cliff sensors, proximity sensors, bump sensors, imaging sensor, obstacle detection sensors, among other sensors as discussed above such as with reference to FIGS. 2A-2B and 3. Some of the sensors may sense obstacles (e.g., occupied regions such as walls) and pathways and other open spaces within the environment. Some of the sensors may recognize or classify an object (e.g., a door, or a clutter), determine the location, state, or other characteristics of the object.

The controller circuit 520, which is an example of the controller circuit 109, can generate and manage a semantic map using the sensor data collected by the sensor circuit 510, a base semantic map 532 stored in the memory 530, and optionally user input 542 received from the user interface 540. The controller circuit 520 may be implemented as a part of a microprocessor circuit, which may be a dedicated processor such as a digital signal processor, application specific integrated circuit (ASIC), microprocessor, or other type of processor for processing information including physical activity information. Alternatively, the microprocessor circuit may be a processor that may receive and execute a set of instructions of performing the functions, methods, or techniques described herein.

The controller circuit 520 may include circuit sets comprising one or more other circuits or sub-circuits, such as an occupancy map generator 521, a semantic map management circuit 522, and a navigation controller 529. These circuits or modules may, alone or in combination, perform the functions, methods, or techniques described herein. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

The occupancy map generator 521 can generate an occupancy map based on the occupancy information sensed by the sensor circuit 510. The occupancy map can include various types of robot maps. In an example, the occupancy map may be represented by a top-down view of the environment traversable by the mobile robot. In another example, the occupancy map may be represented by a floor-type map representing different floor types in the environment. In an example, simultaneous localization and mapping (SLAM) techniques as discussed above with reference to FIG. 1 may be used to extract occupancy information of the environment from the sensor data, and to generate an occupancy map of the environment. In an example, the sensor data collected by the image capture device 140 can be used for techniques such as vision-based SLAM (VSLAM) in which the controller circuit 522 can extract visual features corresponding to objects in the environment and construct the occupancy map using these visual features. As a drive system moves the mobile robot about the environment during the mission, the occupancy map generator 521 can use the SLAM techniques to determine a location of the mobile robot within the map by detecting features represented in the collected sensor data, and comparing the features to previously stored features.

Figure 8:
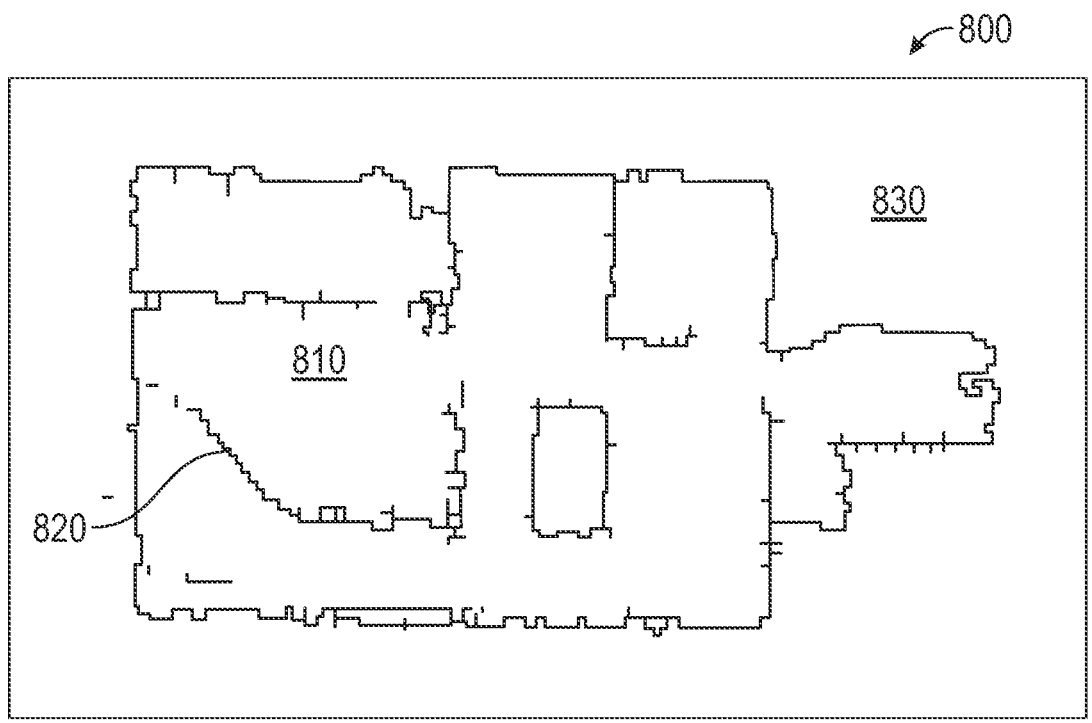
FIG. 8 illustrates an example of an occupancy map of an environment corresponding to a first mission of a mobile robot.

The occupancy map formed from the sensor data may indicate locations of traversable space (e.g., open floor space) and non-traversable space (e.g., obstacles). The occupancy map may be presented as a binary image or a grayscale image. By way of example and not limitation, FIG. 8 illustrates an occupancy map 800 corresponding to a mobile robot mission. The occupancy map 800 includes free areas 810 that the mobile robot can traverse without any obstruction, occupied areas 820 such as walls or objects sensed by the mobile robot, and unexplored areas 830 where the mobile robot has not be ventured, or not documented in the occupancy map.

Figure 6:
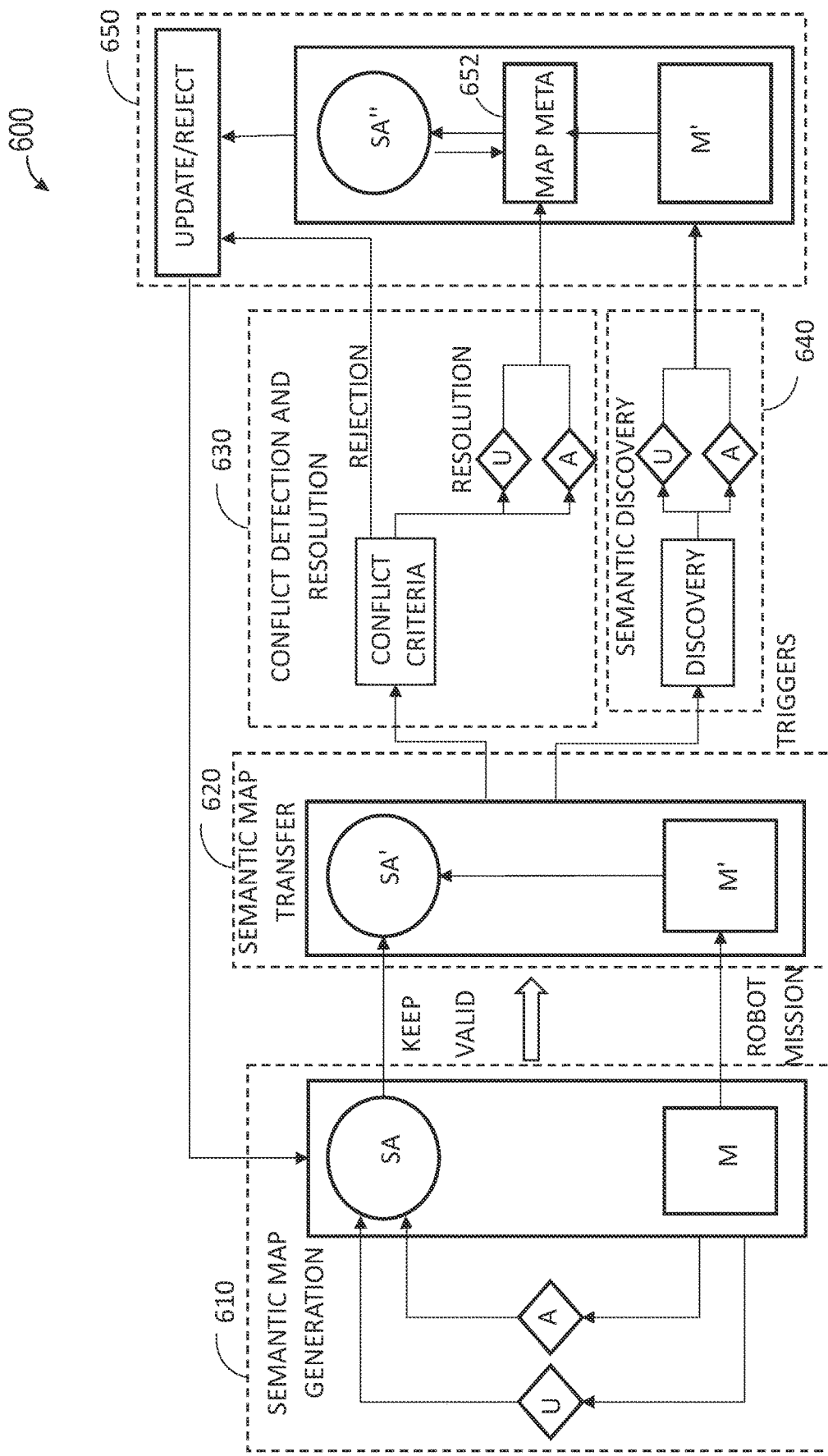
FIG. 6 is a flow diagram illustrating an exemplary process of generating and managing a semantic map.

The semantic map management circuit 522 can include sub-circuits or modules in a microprocessor that receive and execute instructions to perform the functions, methods, or techniques described herein. As illustrated in FIG. 5, these sub-circuits or modules may include a semantic map generator 523, a semantic annotation (SA) transfer module 524, an SA conflict detector 525, an SA conflict resolver module 526, an SA discovery module 527, and a semantic map update module 528. Corresponding to these sub-circuits or modules, FIG. 6 illustrates an exemplary process 600 of generating and managing a semantic map, which can be implemented in and executed by various sub-circuits or modules of the semantic map management circuit 522. As illustrated in FIG. 6, the process 600 includes a semantic map generation process 610 corresponding to the semantic map generator 523, a semantic map transfer process 620 corresponding to the SA transfer module 524, a semantic conflict detection and resolution process 630 corresponding to the SA conflict detector 525 and the conflict resolver module 526, a semantic discovery process 640 corresponding to the SA discovery module 527, and a semantic map update process 650 corresponding to the semantic map update module 528. Various examples of the sub-circuits or modules of the semantic map management circuit 522, and their corresponding processes as shown in FIG. 6, are described as follows.

Examples of Semantic Map Generation

The semantic map generator 523 may generate a semantic map using the occupancy map (denoted by "M", as shown in FIG. 6) and semantic annotations (denoted by "SA", as shown in FIG. 6). The semantic annotations may include information about a location, an identity, or a state of an object in the environment, or constraints of spatial relationship between objects, among other object or inter-object characteristics. In an example, the semantic map generator 523 may employ SLAM techniques to detect, classify, or identify an object, determine a state or other characteristics of an object using sensor data (e.g., image data, infrared sensor data, or the like). Other techniques for feature extraction and object identification may be used, such as geometry algorithms, heuristics, or machine learning algorithms to infer semantics from the sensor data. For example, the semantic map generator 523 can apply image detection or classification algorithms to recognize an object of a particular type, or analyze the images of the object to determine a state of the object. For instance, if a door is detected, its state of being open or closed, locked or unlocked, can also be determined. Information describing the classified objects, their state, location, etc. can be included in the semantic map as semantic annotations ("SA" in FIG. 6). Such an algorithm-based SA generation process is denoted by "A" in the semantic map generation process 610 in FIG. 6.

Figure 9:
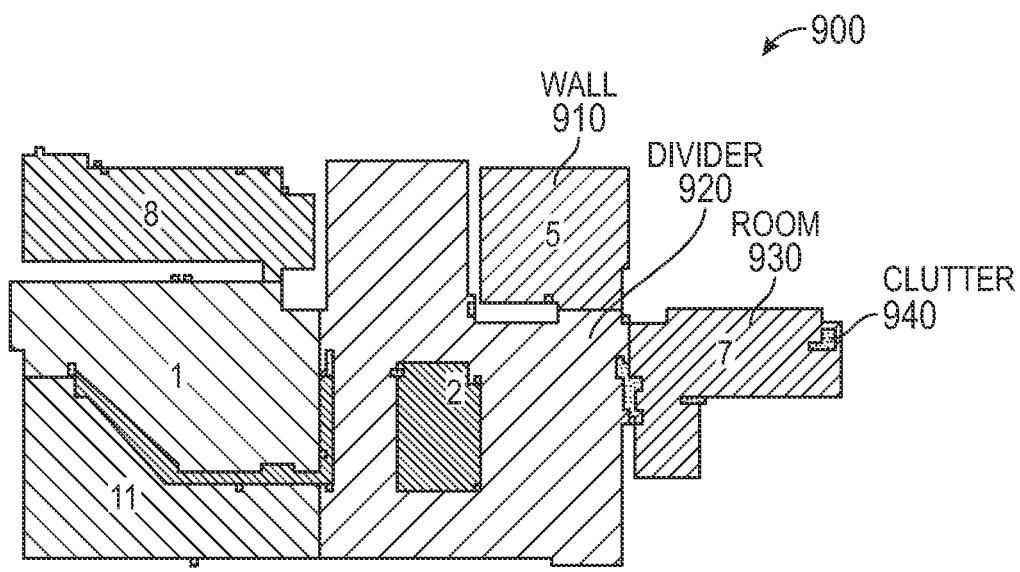
FIG. 9 illustrates a semantic map corresponding to the first mission, generated based on the occupancy map shown in FIG. 8.

An example of a semantic map is illustrated in FIG. 9. The sematic map 900 can be generated based on the occupancy map 800. The semantic map 900 includes semantic annotations of walls, dividers, and rooms (labeled as 1, 2, 5, 7, 8 and 11) separated by the walls and/or dividers. The semantic annotations, such as wall 910, divider 920, room 930, and clutter 940, can be algorithmically generated using the SLAM techniques. For example, to recognize the wall 910 from the occupancy map, the semantic map generator 523 can include a denoise module to remove or attenuate noise from the occupancy map, extract image features therefrom, and estimate location, size, dimension, shape, state, among other characteristics, of the wall. The semantic annotations for the wall 910 may include constraint that a wall is associated with obstacles in the occupancy map.

The divider 920 separates sections of the home. The sections could be physical rooms in the home, or connected spaces in which the mobile robot traverses in one mission (e.g., floor areas that need to be cleaned as one unit for a cleaning robot). In an example, the semantic map generator 523 can estimate the location, size, dimension, shape, state of the divider 920. For example, the divider 920 may include doors, with their characteristics and states (e.g., open or closed). The semantic annotation for the divider 920 may include constraint that it ends at walls or other dividers in the occupancy map.

The room 930 can be defined by walls and/or dividers, and is thus an example of semantics derived from other semantics. In addition to location, size, dimension, shape, state, or other semantic characteristics specific to a room, room semantics may also include room type, such as kitchen, bedroom, office, bathroom, common area or hallway, storage closet, utilities room, and the like. The room semantics may include constraints that their boundaries are coupled to walls and dividers. By processing all the dividers and walls in the map, a home is separated automatically into rooms. The semantic map generator 523 can automatically determine a perimeter of the room 930 using the spatial and geometrical information about the walls and dividers as the mobile robot traverses along a divider and follows all the connected wall segments in succession. In an example, the room 930 may be represented as polygons with sides defined by the walls and/or dividers. Room semantics enable the resultant semantic map to be visualized as an intuitive floorplan of the home, and enables more efficient room-by-room missions (e.g., cleaning or surveillance). Room semantics also has a benefit of more intuitive user experience with the mobile robot. For example, the mobile robot can interpret a user's command "clean the kitchen" and behave accordingly using the semantic annotation of a kitchen.

The clutter 940 represents small objects placed next to walls or in the interior of rooms. Having a capability of identifying and displaying a clutter can improve user experience and lead to more efficient path planning and navigation for the mobile robot. In an example, the semantic map generator 523 can automatically estimate location, size, dimension, shape, or state of the clutter 940. For instance, the footprint of a couch or table can help locate the living room in a semantic map. In an example, the semantic map generator 523 can use a deep learning algorithm to detect and recognize clutter from the sensor data (e.g., an image). An example of the deep learning algorithm includes Convolutional Neural Networks (CNN) trained to classify features on an image (e.g., a pixel or a group of pixels) as representing a clutter or not. The CNN algorithm can be followed by a heuristic that aggregates information from all connected pixels and determines their label as clutter or not. By distinguishing clutter objects attached to walls, a more accurate estimation of true walls in the home can be achieved. In an example, the clutter 940 can be annotated, graphically or textually, in the map differently from other semantic objects such as walls or dividers to help the visualization. The semantic annotations for the clutter 940 may include a constraint that the clutter 940 is associated with obstacles in the occupancy map.

Table 1 below shows by way of example and not limitation various semantics, corresponding constraints, and motivation for those constraints, including the semantics such as wall 910, divider 920, room 930, and clutter 940 as discussed above.

TABLE 1

| Semantic Annotations and Constraints | | | |
|---|---|---|---|
| Semantic | Physical meaning | Constraint | Motivation for constraint |
| Occupancy pixels | Occupied regions in map | Must be sensed by robot | Used as cost map in planning, constraint helps use robot's best estimates for occupied pixels |
| Clutter | Temporary/dynamic objects | Lies on occupancy pixels | Yields accurate visualization on semantic map |
| Wall | Shape of environment | Within a distance on occupied pixels | Yields accurate representation of rooms |
| Divider | Boundary between rooms | Ends on wall or another divider | Enclosed rooms are well-defined |
| | | Annotated by user | User is final authority on segmentation of the space |
| Room | Spaces in the environment | Defined by wall sections and dividers | Room polygon tightly corresponds to physical space, hence robot can cover space satisfactorily |

Figure 7A:
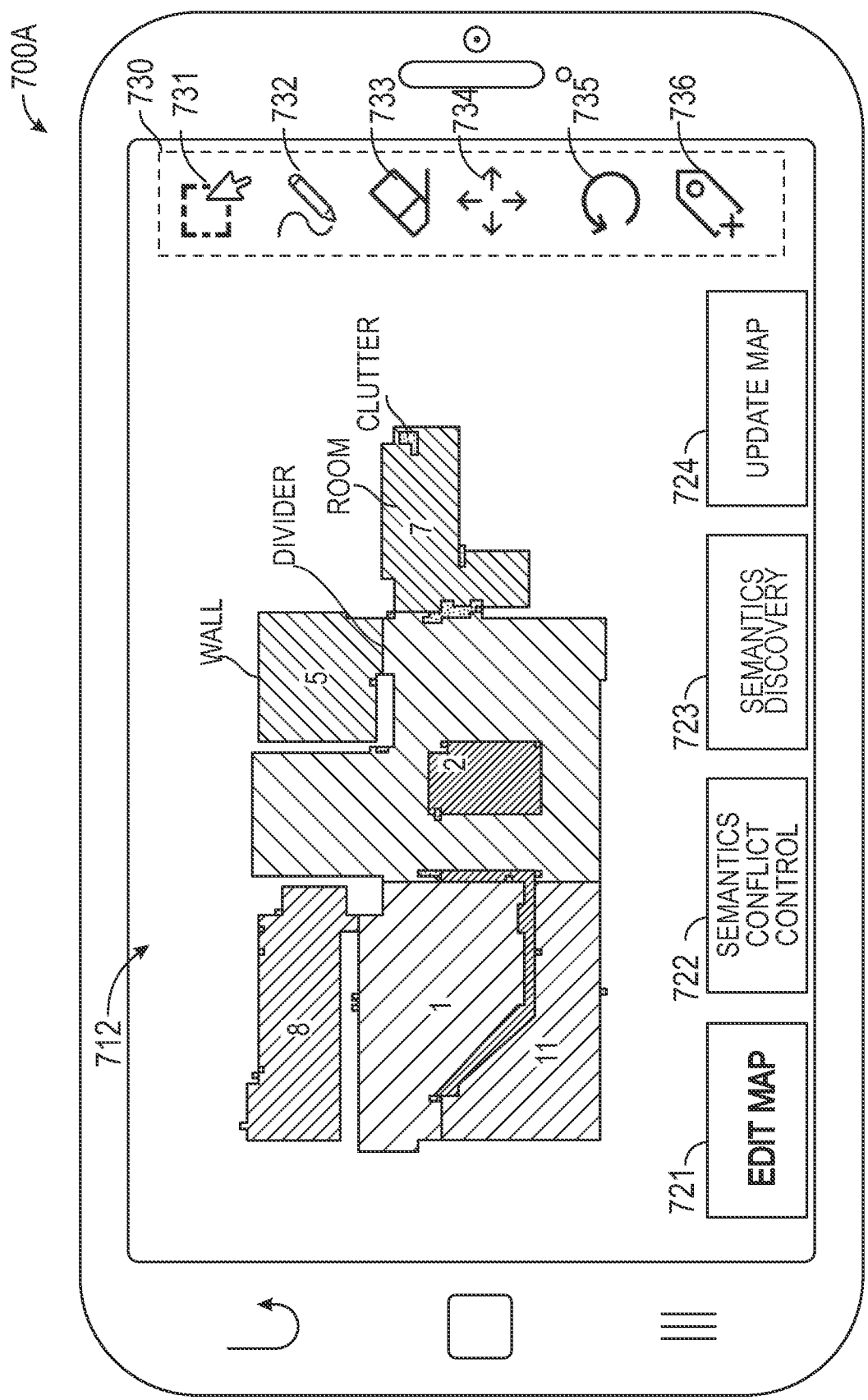
FIGS. 7A-7D illustrate a user interface to display a semantic map, and to receive user feedback on semantic map generation, maintenance, and update.

In some examples, at least some semantic annotations may be added by a user via the user interface 540 (denoted by "U", as shown in FIG. 6). Identification, attributes, state, among other object characteristics and constraints, can be manually added to the semantic map by a user. In an example, the user interface 540 can be included in the mobile device 404 configured to be in communication with the mobile robot, and the controller circuit 520 is at least partially implemented in the mobile robot. The user interface can be configured to display, via a display unit 544 and under a user control, the semantic map generated by the semantic map generator 523. Optionally, the occupancy map may be displayed. The user interface may receive via the user input 542 a user instruction to add, remove, or otherwise modify one or more semantic annotations. Referring now to FIG. 7A, a user interface 700A (such as one on a mobile device 404) can include a display unit to display a semantic map 712 and a menu bar including control elements. A user can manipulate the semantic map 712 and perform various semantic map management operations via the control elements including, by way of example and not limitation, an Edit Map element 721, a Semantics Conflict Control element 722, a Semantic discovery element 723, and an Update Map element 724. By clicking on (or selecting via other means) the Edit Map 721, a user can access a toolbox 730 including, by way of example and not limitation, a Selection tool 731 to select or deselect an object (e.g., a wall, a divider, a room, or a clutter) from the semantic map 712, a Pencil tool 732 to add a new semantic annotation (e.g., to draw a room or a wall) or to modify an existing semantic annotation (e.g., to widen a door), an Eraser tool 733 to remove or modify an object, a Move tool 734 to move/translate an object to a different location on the semantic map, a Rotate tool 735 to rotate an object, and a Label tool 736 to annotate a selected object or a newly added object. A user can add, remove, or modify semantic annotations on the semantic map 712.

Examples of Semantic Transfer

Returning now back to FIG. 5, the semantic map generator 523 can generate a semantic map each time the mobile robot performs a mission. For example, as the mobile robot performs a first mission in the environment (e.g., cleaning floors in a home), the sensor circuit 510 collects occupancy information, the occupancy map generator 521 generates an occupancy map, and the semantic map generator 523 generates a first semantic map. The first semantic map can be displayed on the user interface 540, edited by the user, and stored as a base semantic map 532 in the memory 530. The occupancy map on which the base semantic map 532 is constructed is referred to as a base occupancy map (M in FIG. 6), which includes base occupancy information when the mobile robot performs a first mission in the environment. The semantic annotations on the base occupancy map are referred to as base semantic annotations (SA in FIG. 6). As the mobile robot is set to perform a second mission subsequent to the first mission in the environment, semantic annotations corresponding to the first mission, which are included in the stored base semantic map 532, can be transferred from the base (first) semantic map to a new (second) semantic map corresponding to the second mission, via the SA transfer module 524. The resulting transferred semantic annotations (denoted by SA', as shown in FIG. 6), can be validated and made available for reuse in the second mission, such as for path planning or navigational control of the mobile robot.

Figure 10:
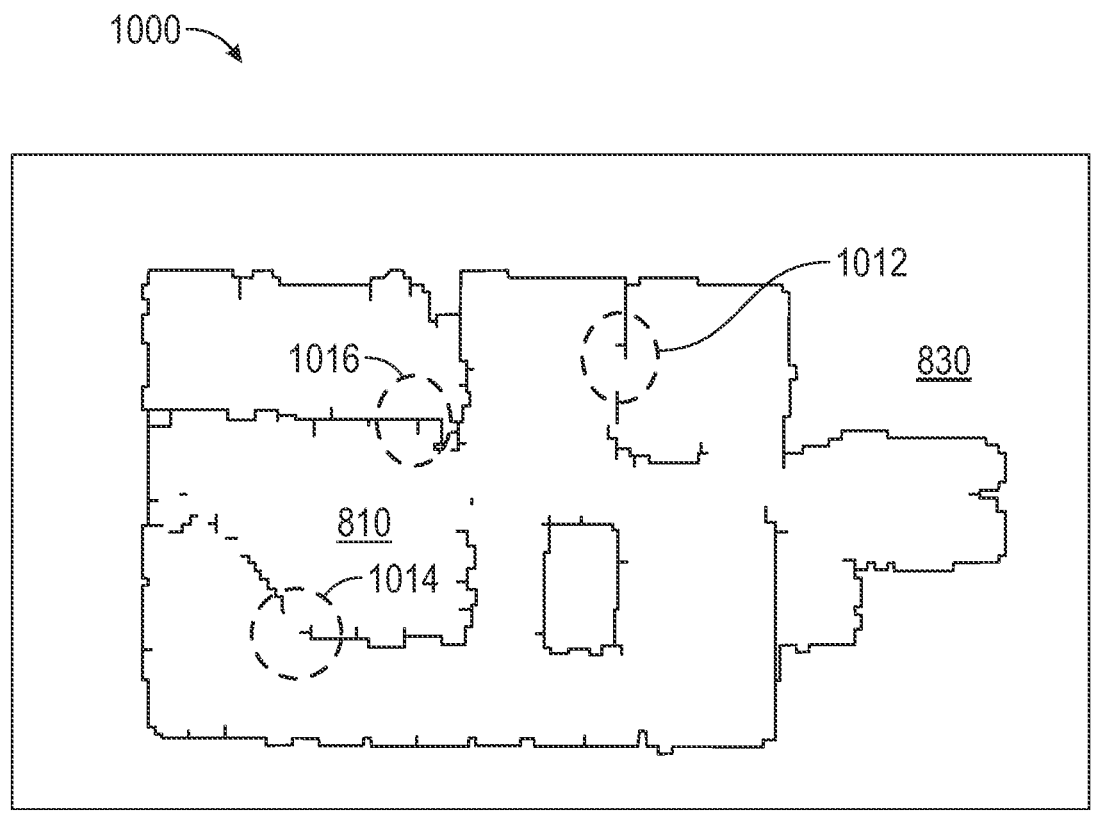
FIG. 10 illustrates an occupancy map corresponding to a second mission of the mobile robot different from the first mission as described with reference to FIG. 8.

The mobile robot may sense the environment and the objects therein differently from one mission to another. This may be due to changes in the environment (e.g., objects taken away or moved to a different location, a change in a state such as a previously open door is now closed), or due to uncertainty in the mobile robot's algorithmically generated representation of the objects (e.g., sensing error, misrecognition of a size of shape of an occupancy area or a free area, or misidentification or misclassification of an object). As a result, the occupancy information and/or semantic information of objects may differ from one mission to another. For example, FIG. 10 illustrates an occupancy map 1000 of the same space as illustrated in the occupancy map 800 in FIG. 8. The occupancy map 800 corresponds to a first mission, and the occupancy map 1000 corresponds to a later second mission. Previously connected obstacles in the occupancy map 800 are shown as disconnected obstacles 1012 and 1014, either due to moved objects or sensing errors. A previously open path in the occupancy map 800 is shown as a closed path 1016, which may be due to a change of state of an object (e.g., a previously open door is now closed.)

In an example, the SA transfer module 524 can transfer the semantic annotations by tracking the motion of spatial components of semantics. For example, to transfer the base semantic annotations of the base semantic map 532, a SLAM system can track the motion of objects in the environment. For the second mission, semantic annotations of the base semantic map 524, such as locations of rooms, dividers, and walls, can be delivered to the SLAM system. As the mobile robot moves about the environment in its second mission, the SLAM system can update robot location, and detect and track locations of the rooms and dividers. At the end of the second mission, the SLAM system can return motion estimates for the rooms and the dividers. However, some semantic information from these motion estimates may be missing or altered. For example, shapes of a room or a wall may be changed due to environmental change between the first and the second missions (e.g., removal and adding of clutter objects to the wall, opening and closing of doors, or moving of large pieces of furniture).

One requirement for semantic transfer is to retain the mutual constraints among the semantic annotations after map transfer from one robot mission to another (e.g., to ensure that rooms are tightly coupled with walls after every mission). To improve transfer accuracy of room and divider shapes, in an example, the SLAM system can estimate new walls from the occupancy map generated for the second mission, associate the previously tracked divider endpoints (from the stored base semantic map) to the estimated new walls (such as by moving the divider endpoints to the nearest new wall) to obtain new divider endpoints, and reconstruct the room shape from the new walls and dividers with the new endpoints. Divider endpoint association and room reconstruction can minimize or reduce the error in the tracked room shape and dividers and the walls in the new map, thereby improving the accuracy of transferring room and divider shapes from one mission to another.

The tracked room shapes discussed above may also be used to improve transfer accuracy of other semantics such as walls and clutter, thereby keeping these semantics consistent across robot missions. In an example, the transfer of walls or clutter includes a process of classifying an obstacle, detected from the second occupancy map corresponding to the second mission (denoted by M' in the semantic map transfer process 620 in FIG. 6), as a wall or a clutter. In an example, obstacles in the second occupancy map that are within a threshold distance to the tracked room boundaries can be classified as wall obstacles. In an example, obstacles that lie in the interior of previously tracked room boundaries can be classified as clutter obstacles. Then, walls can be estimated from the second occupancy map based on the wall or clutter classification of obstacles. As such, walls and clutter can be transferred with less error, and remain consistent between the base semantic map and the second semantic map.

Examples of Semantic Conflict Detection and Resolution

Figure 11:
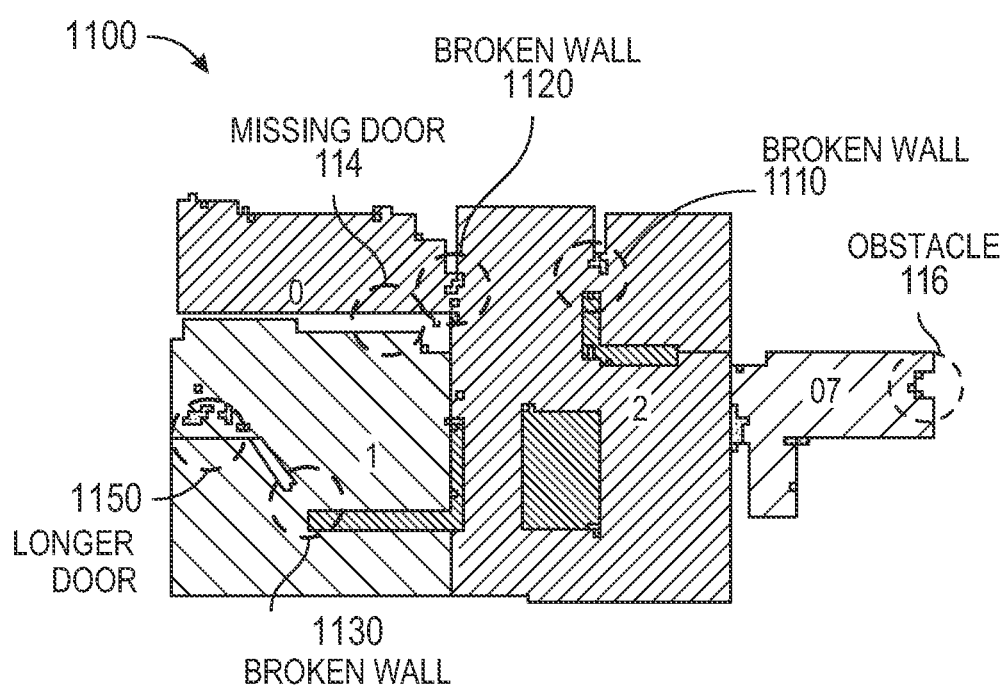
FIG. 11 illustrates a semantic map corresponding to the second mission, generated using semantic annotations transferred from the first semantic map as show in FIG. 9.

The transfer of semantic annotations from the base semantic map corresponding to the first mission to a new (second) semantic map corresponding to a subsequent second mission can sometimes result in missing semantics, or invalid semantics that violate the semantic constraints. FIGS. 11, 12A-12B, and 13A-13B illustrate examples of unsuccessful transfer of semantics. FIG. 11 illustrates a semantic map corresponding to the second mission, generated using semantic annotations transferred from the first semantic map 900 as shown in FIG. 9. Compared to the semantic map 900, several semantic annotations have been missing or altered after transfer, including a broken wall 1110 between the previously labeled room 5 and room 2 (on the semantic map 900), a broken wall 1120 between the previously labeled room 8 and room 2, a broken wall 1130 between the previously labeled room 11 and room 1, a missing divider (e.g., a door) 1140 between the previously labeled room 1 and room 8, a distorted (longer) divider (e.g., a door) 1150 between the previously labeled room 11 and room 1, and an obstacle 1160 being a false recognition and annotation of the clutter 940. Due to the broken walls 1110 and 1120, the previously labeled rooms 5, 2, and 8 are connected and combined as one undivided region annotated as a new room 2 on the new semantic map. Similarly, the broken wall 1130 results in the previously labeled rooms 11 and 1 being connected and combined into one undivided region annotated as room 1 on the new semantic map.

Figure 12A:
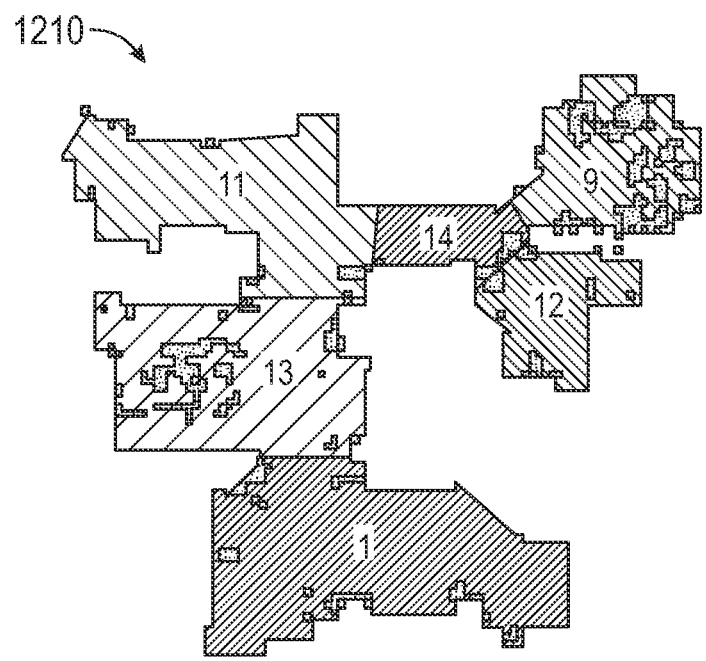
FIGS. 12A-12B illustrate an example of semantic conflicts between semantic maps before and after map transfer.
Figure 12B:
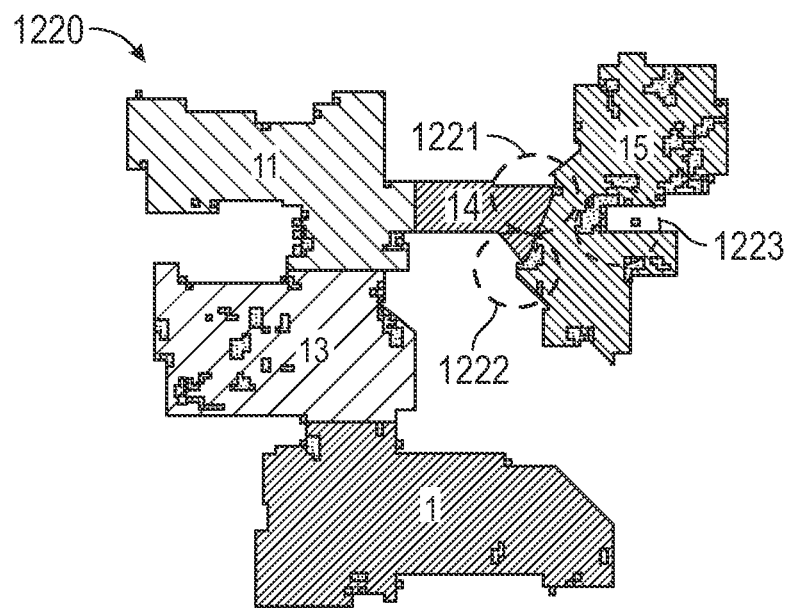

FIG. 12A is an example of a base semantic map 1210 corresponding to a first mission of the mobile robot. The base semantic map 1210 includes semantic annotations of walls, dividers, and rooms numerically labeled as rooms 1, 13, 11, 14, 9, and 12. FIG. 12B illustrates a new semantic map 1220 transferred from the base semantic map 1210. Some semantic annotations are missing or have been altered after transfer, including a different divider (e.g., a door) orientation 1221 between the previously labeled room 9 and room 14, a different divider (e.g., a door) orientation 1222 between the previously labeled room 12 and room 14, and a shortened wall 1223. The shortened wall 1223 can result from misrecognition of a part of the wall as clutter, which is not included in the new semantic map 1220. The divider orientations 1221 and 1222 change the shape of the neighboring room 14. Additionally, due to the new divider orientations 1221 and 1222 and shortened wall 1223, previous separate rooms 9 and 12 are connected into one combined region annotated as a new room 15 in the new semantic map. The previously labeled rooms 9 and 14 are missing from the new map 1220.

Figure 13B:
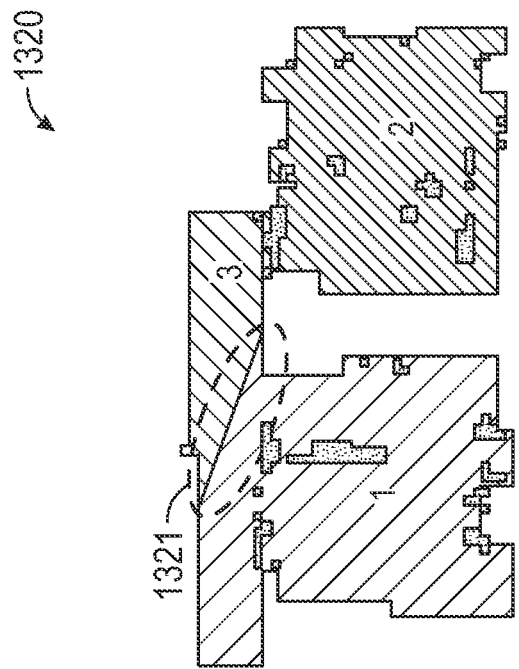
FIGS. 13A-13B illustrate another example of semantic conflicts between semantic maps before and after map transfer.
Figure 13A:
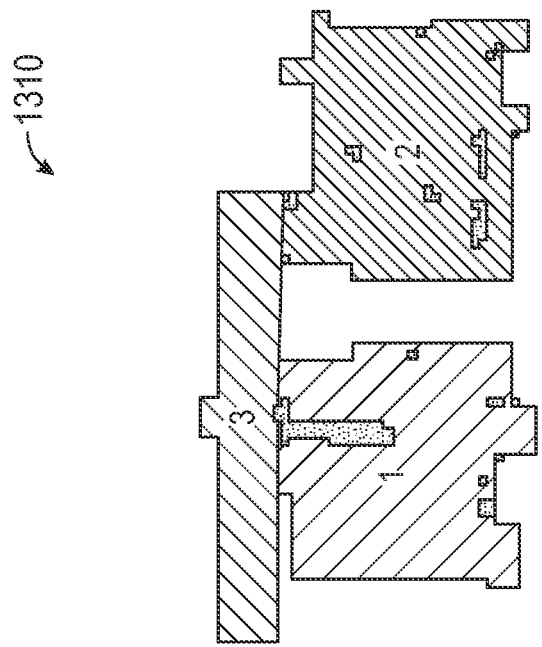

FIG. 13A is another example of a base semantic map 1310 corresponding to a first mission of the mobile robot. The base semantic map 1310 includes semantic annotations of walls, dividers, and rooms defined by the walls and dividers that are numerically labeled as rooms 1, 2, and 3. FIG. 13B illustrates a transferred semantic map 1320 from the base semantic map 1310. The semantic map 1320 includes a semantic annotation of a divider 1321 orientated differently from the divider between the previously labeled room 1 and room 3. As a result, a portion of the previously labeled room 3 is connected to and combined with room 1, and annotated as new room 1 in the new semantic map. Accordingly, room 3 in the new semantic map has a different shape from the previously labeled room 3.

Missing or altered semantics such as due to transfer errors or changed environment as discussed above may result in conflicts of semantic annotations (the "SA conflicts") between a previous semantic map (e.g., the base semantic map stored in the memory) and the transferred semantic map. Referring back to FIG. 5, SA conflicts can be detected automatically by the SA conflict detector 525, which corresponds to the conflict detection and resolution process 630 in FIG. 6. In an example, the SA conflict detector 525 can determine a presence or absence of conflict based on a precision and recall measure (PRM) between the transferred semantic map and the stored base semantic map. The PRM is a statistical metric, or a set of metrics, that characterize(s) relevancy of a retrieved instance. A precision (also called positive predictive value) is a fraction of relevant instances among the retrieved instances, or a ratio of true positive (TP) instances to the total positively predicted cases (the sum of TP and false positive predictions, or FP). A recall (also known as sensitivity) is a fraction of the total amount of relevant instances that were actually retrieved, or a ratio between the TP instances to the total actual positive instances (the sum of TP and false negative predictions, or FN). In an example, the PRM can be represented by a composite metric that combines precision and recall, such as an F1 score that is computed as a harmonic mean of precision and recall. The SA conflict detector 525 can determine that a conflict is present if the PRM satisfies a specified condition, such as the precision and recall falls below respective thresholds. For example, in FIG. 12B, after transfer, previously labeled room 9 is missing from the transferred map 1220, room 9 therefore has zero recall. In FIG. 13B, despite all the previously labeled rooms are present in the transferred map 1320, room 3 is not recalled sufficiently in the transferred map 1320. If the recall falls below a predetermined threshold, the SA conflict detector 525 can determine that a conflict is present.

If a semantic conflict is determined to be present, the SA conflict resolver 526 can resolve the conflict to recover the missing semantics or to correct the altered semantics, while keeping the robot occupancy map unaltered. Depending on the nature of conflict, different meta information can be identified and incorporated into the semantic map to resolve the conflict. The meta information can be stored as a separate layer of Map Meta 652 as shown in FIG. 6. In an example, the conflict is represented by disconnected walls (e.g., the broken walls 1110, 1120, or 1130 in FIG. 11). The disconnected walls and the dividers would prevent correct reconstruction of a new room on the new semantic map. The SA conflict resolver 526, corresponding to the conflict detection and resolution process 630 in FIG. 6, can generate a difference occupancy map between the second occupancy map and the base occupancy map, and identify from the new semantic map a region adjoining the detected semantic conflict. Then, a portion of the difference occupancy map corresponding to the identified region can be added back to the candidate occupancy map.

Figure 14A:
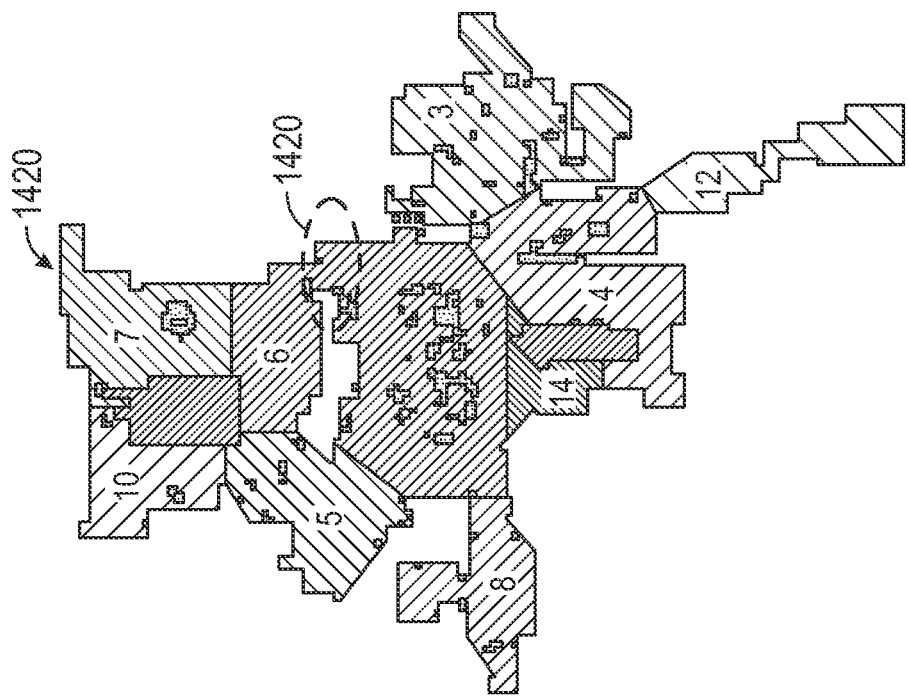
FIGS. 14A-14B illustrate yet another example of semantic conflicts between semantic maps before and after map transfer.
Figure 14B:
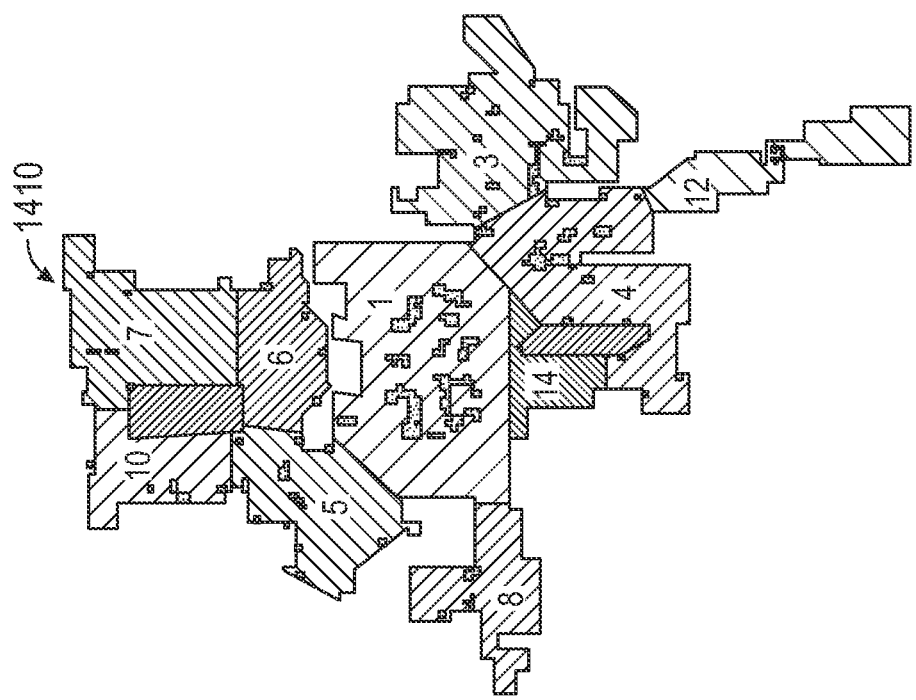
Figure 15B:
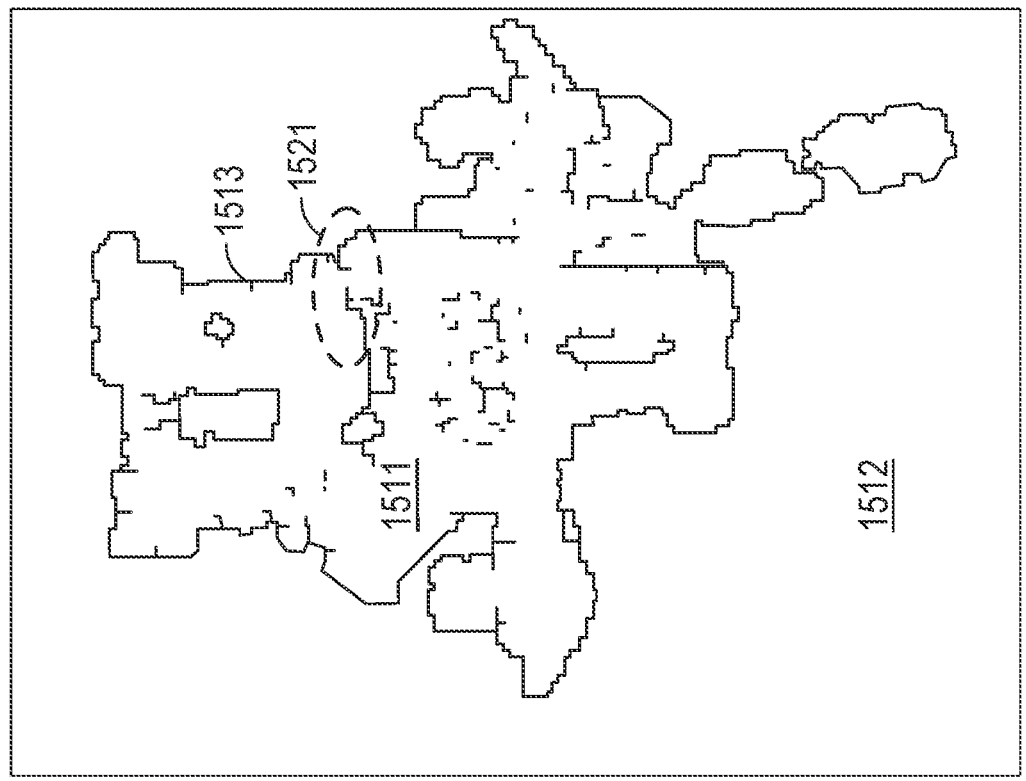
FIGS. 15A-15B illustrate occupancy maps of the environment corresponding to the first and second missions of the mobile robot.
Figure 15A:
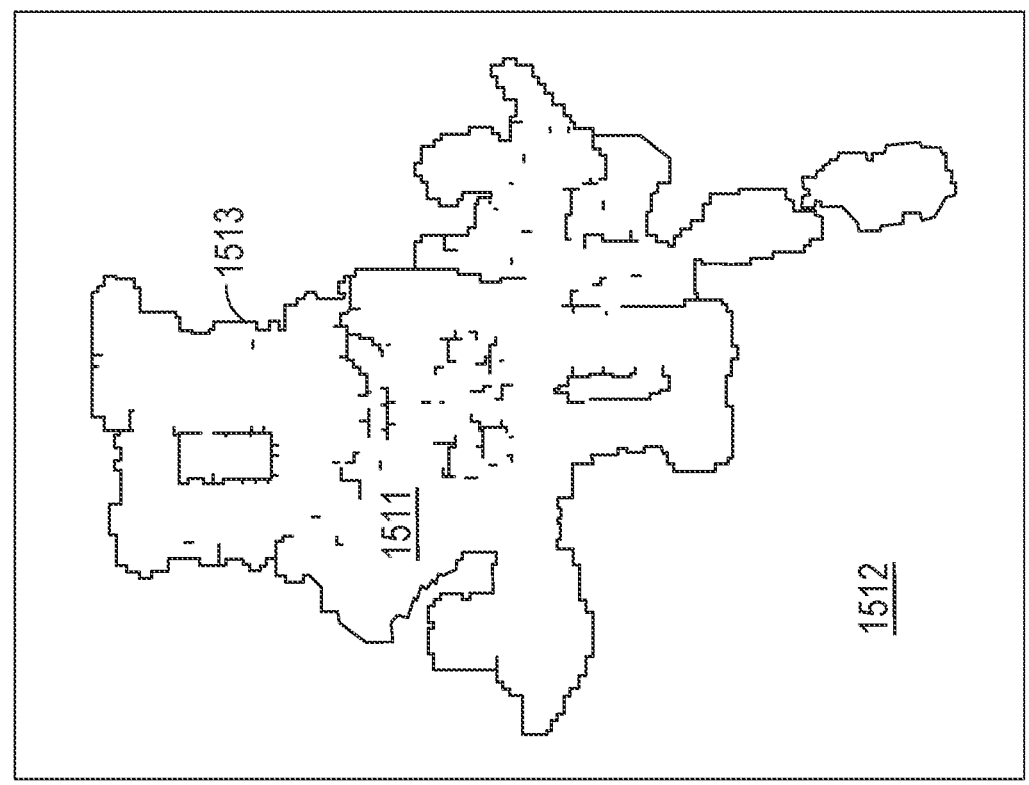
Figure 16B:
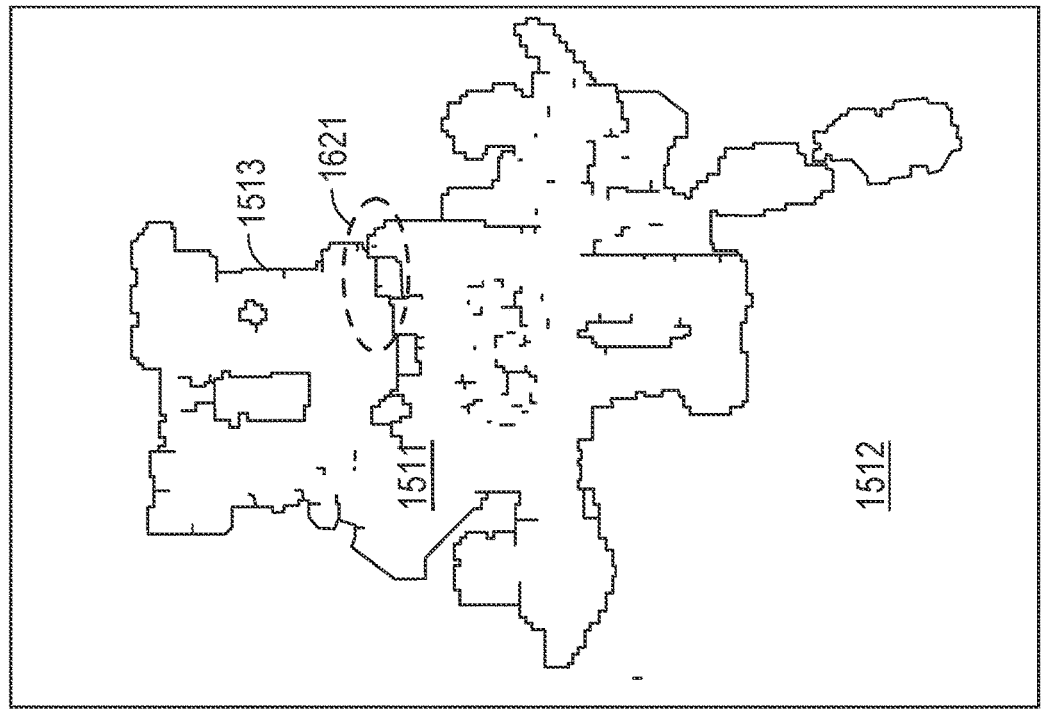
FIGS. 16A-16C illustrate an exemplary algorithmic resolution of semantic conflicts based on a difference occupancy map between the occupancy maps corresponding to the first and second missions of the mobile robot.
Figure 16A:
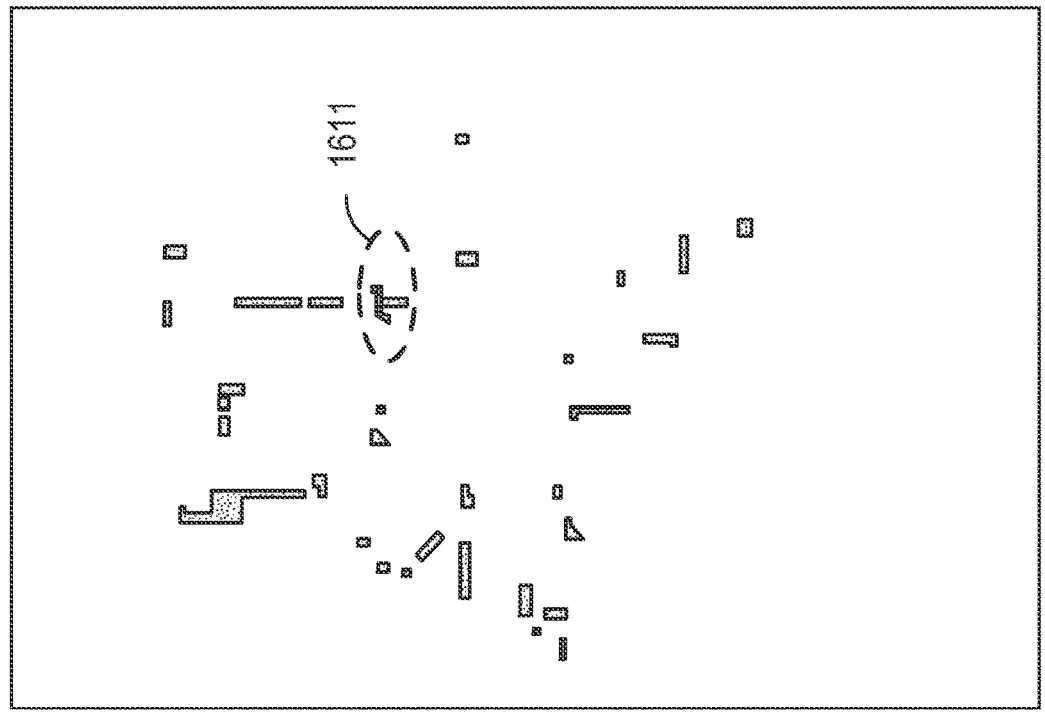
Figure 16C:
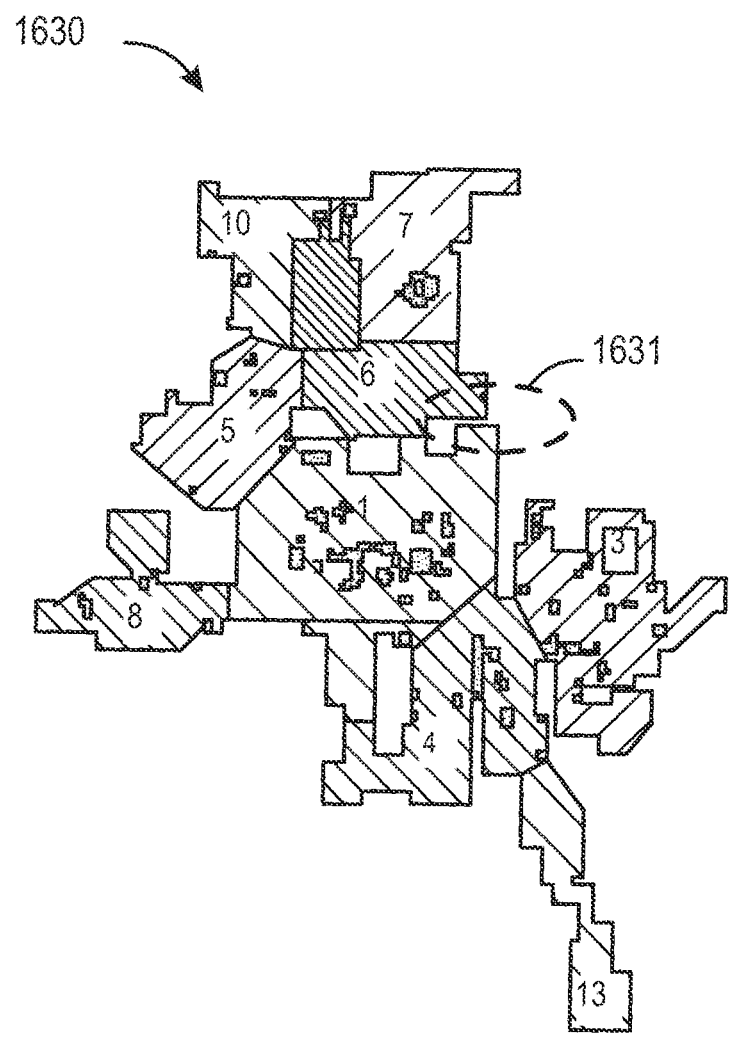

An example of algorithmically resolving the conflicts based on the difference occupancy map (denoted by "A" in the conflict detection and resolution process 630 in FIG. 6) is illustrated in FIG. 14A-16C. FIG. 14A illustrates a base semantic map 1410 including semantic annotations of walls, dividers, and rooms defined by the walls and dividers. FIG. 14B illustrates a semantic map 1420 after transfer, including a semantic annotation of a broken wall 1421 between the previously labeled room 1 and room 6 that is disconnected, resulting in the rooms 1 and 6 being connected and combined into one room annotated as a new room 6. The disconnected wall is also reflected on the corresponding occupancy maps before and after transfer. FIG. 15A illustrates the base occupancy map 1510 corresponding to the base semantic map 1410, and FIG. 15B illustrates a new occupancy map 1520 corresponding to the semantic map 1420 after transfer. Similar to the occupancy map 800, the occupancy maps 1510 and 1520 each include free areas 1511 that the mobile robot can traverse without any obstruction, occupied areas 1513 such as walls or objects sensed by the mobile robot, and unexplored areas 1512 where the mobile robot has not be ventured, or not documented in the occupancy map. A disconnected segment 1521 in the occupancy map 1520 corresponds to the broken wall 1421. The SA conflict resolver 526 can generate a difference map between the base occupancy map 1510 and the new, second occupancy map 1520. The resulting difference map 1610, as illustrated in FIG. 16A, shows wall differences between the occupancy maps 1510 and 1520. The SA conflict resolver 526 can process the difference map 1610 to extract those sections 1611 that represent walls adjoining the conflicts (e.g., rooms 1 and 6 in the present example) on the base occupancy map 1510, but are not walls in the new, second occupancy map 1520. In an example, the extracted wall sections 1611 can be localized automatically using location information of the rooms or objects therearound. Alternatively, the extracted wall section 1611 can be identified by a user via the user interface 540. The SA conflict resolver 526 can add the extracted wall section 1611 back to the candidate occupancy map 1520, resulting in a modified occupancy map 1620 as shown in FIG. 16B. Performing wall estimation and semantic transfer on the modified occupancy map 1620 results in a reconstructed semantic map 1630, as shown in FIG. 16C. The reconstructed semantic map 1630 correctly shows the connected wall section 1631, and has a high precision and recall measure relative to the base semantic map 1410.

In some examples, if a semantic conflict exists between the reconstructed semantic map and the stored base semantic map, the SA conflict resolver 526 can reject a reconstructed semantic map, such as the reconstructed semantic map 1630.

In some examples, semantic transfer may introduce additional walls in the new (second) semantic map. For example, two wall sections that were disconnected in the base semantic map somehow appear to be connected in the new semantic map. This is a converse problem to the disconnected wall example discussed above with reference to FIGS. 16A-16C. The SA conflict resolver 526 can similarly generate a difference map between the base occupancy map and the candidate occupancy map (e.g. between the image between the free space within the tracked room boundaries and the free space within the new walls). The connected components from this difference map represent sections that are free space in the base occupancy map but are walls in the candidate occupancy map. The SA conflict resolver 526 can add back these free sections to the second occupancy map to preserve the original disconnection between walls.

Figure 7B:
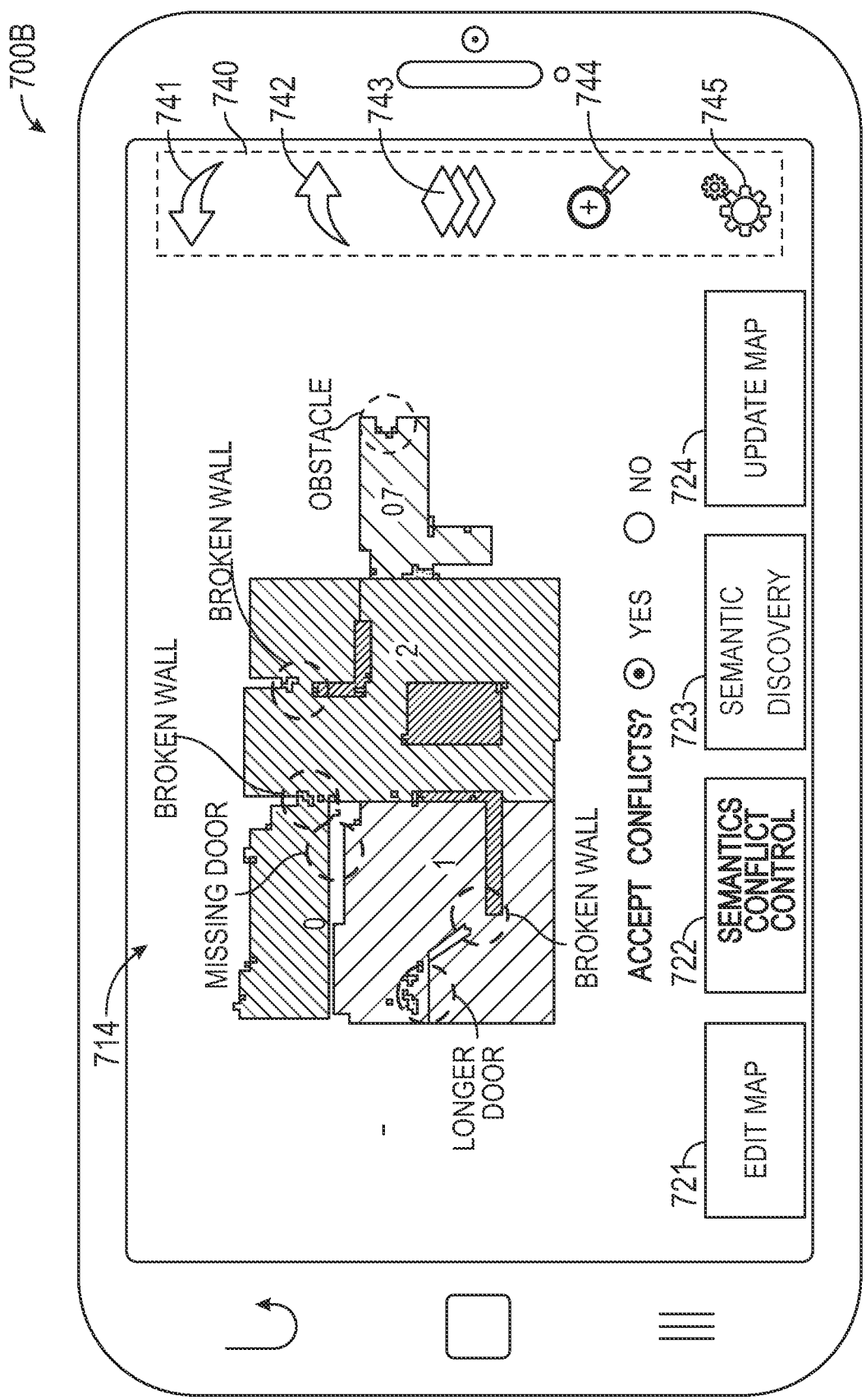

Semantic conflict detection and/or resolution may additionally or alternatively be performed at least partially manually by a user (denoted by "U" in the conflict detection and resolution process 630 in FIG. 6) via the user interface 540. FIG. 7B illustrates a user interface 700B similar to that shown in FIG. 7A. By clicking on the Semantics Conflict Control 722, a toolbox 740 can be displayed and accessible by a user to interact with the semantic map. By way of example and not limitation, the toolbox 740 can include map selection tools 741 and 742 to switch between the new (second) semantic map and the stored base (first) semantic map, an overlay display tool 743 to overlay the base semantic map and the second semantic map, and a zoom tool 744 to zoom in or zoom out a selected region of the map being displayed. The overlay display tool 743 and the zoom tool 744 allow a user to visualize and compare the base semantic map and the new semantic map, and recognize conflicts therebetween (e.g., missing or altered semantics). By clicking on the Edit Map 721, the user may access the map modification tools 730 as shown in FIG. 7A, to mark conflicts and resolve conflicts, such as by connecting a broken wall, moving or rotating a door, drawing a new door, erasing a clutter, extending (by drawing) or shortening (by erasing) a divider, etc. Alternatively or additionally, a user may click on the auto execution tool 745 to run automatic semantic conflict detection and resolution, as discussed above with reference to the SA conflict detector 525 and the SA conflict resolver 526 of the system 500. The detected conflicts, including the missing or altered semantic annotations (e.g., as shown in FIG. 11), and/or the resolved conflicts such as the reconstructed semantic map with corrected semantic annotations (e.g., as shown in FIG. 16C), can be displayed on the semantic map 714. A dialog box may be displayed to prompt the user for input, such as accepting or rejecting the semantic conflicts, or accepting or rejecting the reconstructed (automatically or manually) semantic map with the conflicts resolved. In some examples, a plurality of automatically reconstructed maps with conflicts resolved using different approaches can be presented to a user. A user can then select one map for use in a future robot mission.

Examples of Semantic Discovery

Figure 17B:
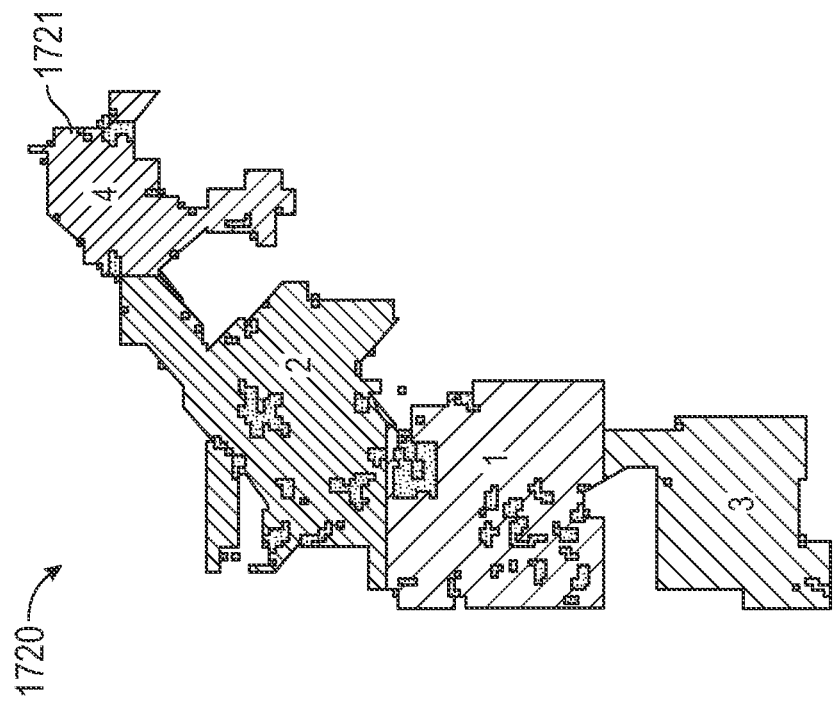
FIGS. 17A-17B illustrate an exemplary discovery of a novel semantic object and addition to the semantic map a supplemental semantic annotation.
Figure 17A:
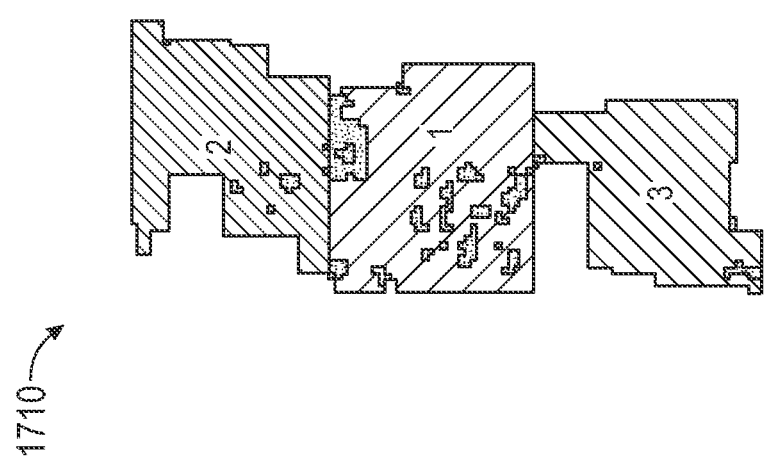

The SA discovery module 527 can be configured to detect novel semantics from a semantic map. Novel semantics represent previously unexplored or undocumented objects in the environment, and absent from the stored base semantic map. The SA discovery module 527 can detect novel semantic objects in response to a trigger condition being satisfied. In an example, the discovery of a new region (e.g., a room) can be triggered if the size of a semantically annotated region on the new (second) semantic map exceeds, by a threshold, the size of the corresponding semantically annotated region on the stored base (first) semantic map. A supplemental semantic annotation for the novel semantic object can be added to the second semantic map if the supplemental semantic annotation satisfies constraints relative to the other semantic annotations on the second semantic map. FIG. 17A illustrates a stored base semantic map 1710 corresponding to a first mission, including semantic annotations of walls, dividers, and rooms defined by the walls and dividers and numerically labeled as rooms 1, 2, and 3. FIG. 17B illustrates a new semantic map 1720 corresponding to a new second mission. Although previous rooms have been correctly transferred, a newly explored section 1721 of the home is discovered. The new section 1721 is identified as a new room labeled as room 4. If it satisfies constraints with respect to other semantic annotations on the map 1720, the new room 4 can be accepted into the new semantic map 1720. Alternatively, a user can accept, reject, add, or modify the new semantics.

Figure 18A:
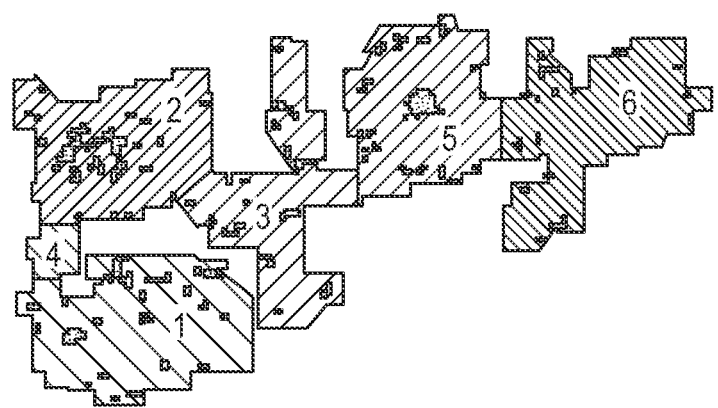
FIGS. 18A-18C illustrate an exemplary discovery of a novel semantic object and addition to the semantic map one or more separators to resolve semantic conflicts.
Figure 18B:
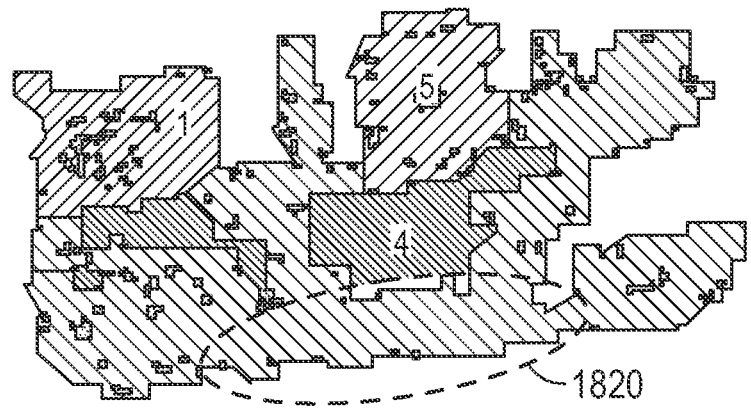
Figure 18C:
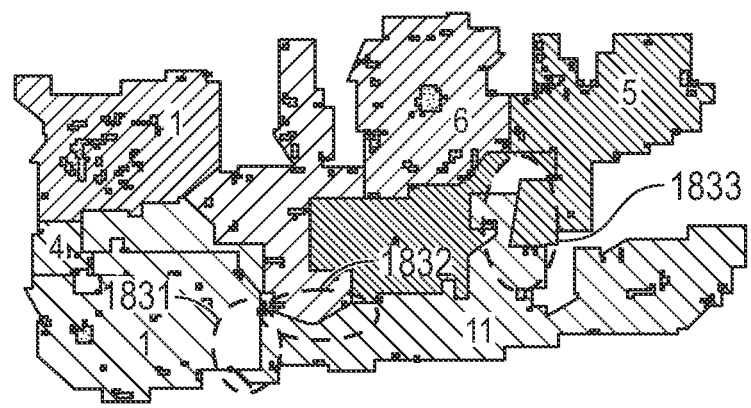

In an example, the novel semantics can include one or more separators added to the new (second) semantic map to resolve conflicts between the base semantic map and the new semantic map. Referring now to FIGS. 18A-18C, a base semantic map as shown in FIG. 18A includes semantic annotations of walls, dividers, and rooms numerically labeled as rooms 1, 2, 3, 5, and 6. In a new mission, the mobile robot explored and found a connecting space 1820 between the previously labeled rooms 1 and 3, and between the previously labeled rooms 3 and 6, as illustrated in FIG. 18B. The connecting space 1820 may be due to a new passage that connects previously, disconnected rooms in a home. The connecting space 1820 results in a recognition of a new combined room that covers the previously labeled rooms 1, 3, and 6.

The connecting space 1820 is a novel space unexplored previously or undocumented in the base semantic map. The new connecting space 1820 may cause ambiguity for the mobile robot. For example, the mobile robot cannot reason by itself which of the previous semantic labels (e.g., 1, 3, or 6) to use for the combined room or how to recover the lost rooms. To resolve this conflict, the SA discovery module 527 can automatically place additional separators in the new semantic map of FIG. 18B to recover the lost rooms. Such an additional separator can be different from a wall or divider. Additional separators can be placed by determining which rooms have been lost in the new semantic map, and adding back the tracked boundary segments of the lost rooms. As illustrated in FIG. 18C, the previously labeled rooms 1, 3, and 6 were lost. The tracked boundary segments 1831 of the lost room 1 are added back to effectively recover room 1. Similarly, the tracked boundary segments 1832 of the lost room 3 are added back to effectively recover room 3, and the tracked boundary segments 1833 of the lost room 6 are added back to effectively recover room 6. The addition of the boundary segments 1831, 1832, and 1833 separate the recovered rooms 1, 3, and 6 from the connecting space 1820. A new room 11 corresponding to the connecting space 1820 can also be identified and annotated on the semantic map.

Figure 7C:
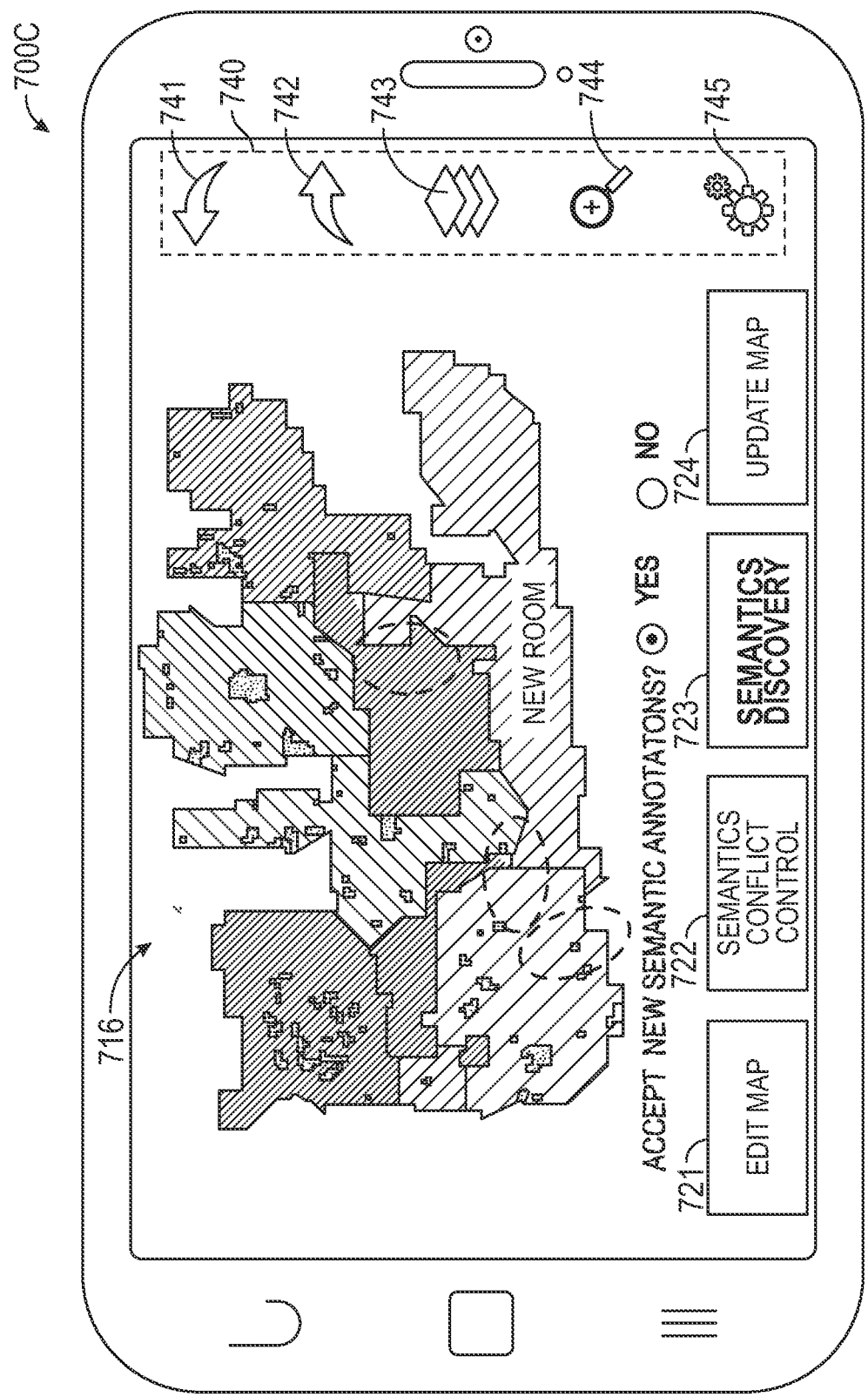

In addition to or in lieu of algorithmically discovering novel semantics (denoted by "A" in the semantic discovery process 640 in FIG. 6) such as new rooms or additional separators as discussed above, semantic discovery may be performed at least partially manually by a user via the user interface 540 (denoted by "U" in the semantic discovery process 640 in FIG. 6). FIG. 7C illustrates a user interface 700C similar to that shown in FIG. 7A. By clicking on the Semantic Discovery 723 option, a user can access the toolbox 740 to interact with the semantic map. As discussed above with reference to FIG. 7B, the overlay display tool 743 and the zoom tool 744 allow a user to visualize and compare the maps, and recognize any novel region previously unexplored or undocumented in the base semantic map, such as the connecting space 1820 as shown in FIG. 18B. A user may then click on the Edit Map 721 to access map modification tools 740 to guide discovery of new semantics, such as by marking a newly discovered region, drawing and annotate new rooms (e.g., the new room 1721 in FIG. 17B) or new objects such as additional separators (e.g., new boundaries 1831, 1832, and 1833 in FIG. 18C), removing or modifying an existing semantic object, or indicating a direction or location for the robot to explore and adding corresponding semantic annotations on the map, among other operations. Additionally or alternatively, a user may click on the auto execution tool 745 to run automatic semantic discovery, as discussed above with reference to the SA discovery module 527 of the system 500. The discovery results and new semantic annotations can be displayed on the reconstructed map 716. A dialog box may be displayed to prompt the user for input such as accepting or rejecting the novel semantics to be added to the semantic map, as depicted in FIG. 7C. In some examples, a plurality of automatically reconstructed maps may be provided to the user. The reconstructed maps include respective supplemental annotation for the novel semantics discovered, such as different room shapes, different separator characteristics, or different combinations of separators to separate the newly discovered region from other rooms. A user can then select one map for use in a future robot mission.

Examples of Semantic Map Update

The semantic map update module 528 can update the base semantic map based on a comparison between the new semantic map and the stored base semantic map. The semantic map update can be triggered by the candidate semantic annotations (denoted by SA" as shown in FIG. 6) satisfying a validity criterion and mutual constraints among the candidate semantic annotations. In an example, at the end of the semantic transfer, conflict detection and resolution, and semantic discovery, a validity and constraint check of the semantic annotations on the new semantic map (e.g., the map with conflicts resolved by the SA conflict detector 525 and the SA conflict resolver 526, and new semantics discovered and added to the semantic map by the SA discovery module 527). If the new semantic map passes the validity and constraint check, it may replace the base semantic map, and be stored in the memory 530 as a new base semantic map. The navigation controller 529 can plan a path or to navigate the mobile robot in future robot missions according to the new base semantic map. If the new semantic map does not pass the validity and constraint check, the original base semantic map remains valid. The navigation controller 529 can plan a path or to navigate the mobile robot in future robot missions using the stored base semantic map. Preserving the original base semantic map maintains semantic consistency, even though some semantic information may be missing as the robot performs subsequent missions.

Figure 7D:
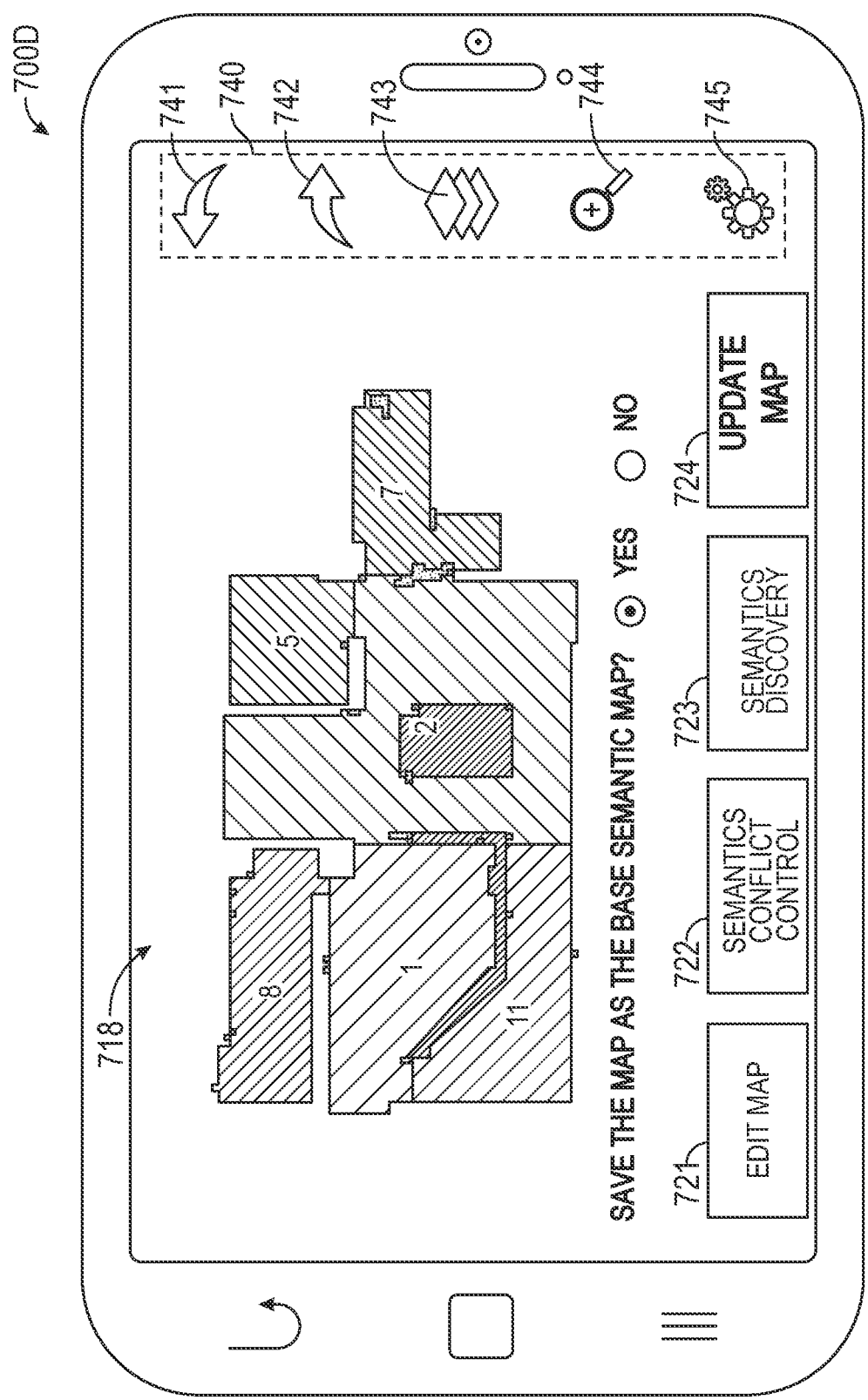

Update of the base semantic map may additionally or alternatively be performed through a user input, such as via the user interface 540. FIG. 7D illustrates a user interface 700D. By clicking on the Update Map option 724, a user can access the toolbox 740 and interact with the semantic map. As described above with reference to FIG. 7B, the toolbox 740 can include map selection tools 741 and 742, an overlay display tool 743, a zoom tool 744, and an auto execution tool 745. Automatic map validity and constraint check may be activated by clicking on the auto execution tool 745. A dialog box may be displayed to prompt the user for an instruction to retain the original base semantic map, or to replace the base semantic map by the new reconstructed semantic map and save the latter to the memory for future use.

In some examples, checking the validity of the new semantic map may involve relaxed constraints for some semantic annotations. The relaxed constraints may be different from the constraints applied to the semantics on the new semantic map or the base semantic map. For example, in semantics conflict resolution, wall section 1611 from the difference map 1610 can be added to the corrected occupancy map 1620. The corrected occupancy map is a version of the occupancy map. However, unlike other black segments on the occupancy map 1620 which represent the occupied regions, the added segment 1621, although appears to be similar to walls, does not satisfy the requirement that the occupied regions represent real obstacles. In other words, the constraint that they relate to obstacles in the occupancy map is relaxed. An additional separator is like a divider. But unlike a divider whose endpoints must lie on a wall or another door, its endpoints may lie on a wall or a door or another separator.

The relaxed constraint may also be applied to the novel semantics discovered and added to the semantic map. For example, with regard to novel semantics, such as discovered by the SA discovery module (e.g., new room 1721 in FIG. 17B, or new connecting space/room 1820 and boundaries 1831, 1832, and 1833 in FIG. 18C), using any instances of the existing semantics (with their constraints) may not adequately or effectively resolve the conflicts, because the constraints associated with the existing semantics restrict how and where the semantics may be placed or interact with other semantics. The SA discovery module 527 may apply semantics less constrained than the existing semantic sets to resolve the conflicts. For example, the boundary segments 1831, 1832, and 1833 shown in FIG. 18C may have relaxed constraints than other existing semantics on the semantic map. The relaxation in the constraints of the Map Meta layer 652 (as illustrated in FIG. 6) allows flexibility in the system to resolve conflicts and guarantee the constraints of the original semantics. Introducing semantics with relaxed constraint can also improve consistency of robot behavior. Table 2 below shows by way of example and not limitation various Map Meta layer semantics and corresponding relaxed constraints.

TABLE 2

Meta Semantics With Relaxed Constraints

| Meta-semantic | Relaxed constraint | Corresponding semantic (and constraint) |
|---|---|---|
| Meta-occupancy pixels | Need not be sensed by robot | Occ. pixels (Must be sensed by robot) |
| Meta-divider | Ends on wall or meta-divider Not annotated by user | Divider (Ends on wall or divider, must be annotated by user) |

Semantic update can be attempted at a specified frequency (e.g., periodically) or according to a specific schedule, such as for every mission, every N missions (N>1, for example, every 5-10 missions), every week, or every month. Additionally or alternatively, semantic update can be attempted in response to a user command. In some examples, semantic update can be based on a comparison between a plurality of semantic maps (corresponding to two or more missions each being subsequent to the first mission) and the stored base semantic map (corresponding to the first mission). Differences detected from at least some of the plurality of semantic maps from the first semantic map can be used for semantic update. In some examples, feature extraction and object identification from the robot occupancy map can be performed for every mission, and the update of semantic map can be attempted every N mission (N>1, e.g., 5-10 missions) or every week, or upon detecting that a significant amount of change has been observed in the occupancy map.

Examples of Methods of Generating and Managing a Semantic Map

Figure 19:
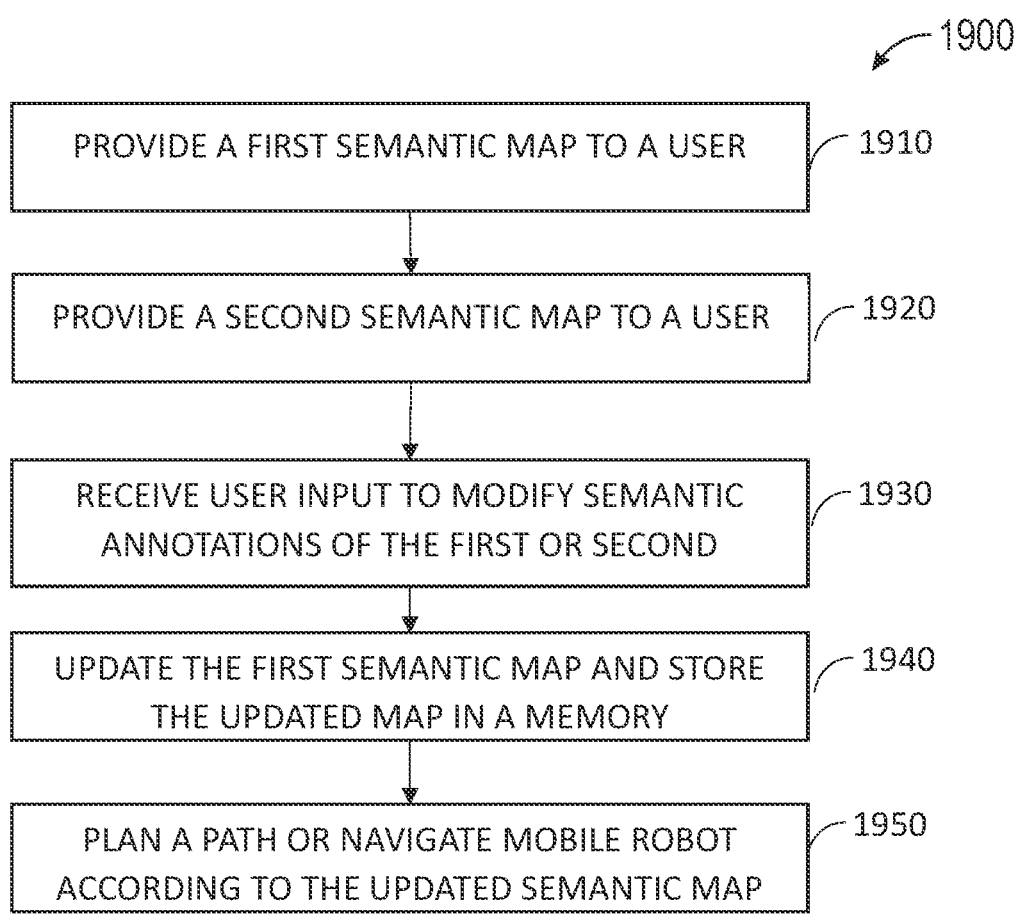
FIG. 19 is a flow diagram illustrating an example of a method of generating and managing a semantic map for a mobile robot moving about an environment.

FIG. 19 is a flow diagram 1900 illustrating an example of a method of generating and managing a semantic map for a mobile robot moving about an environment. The semantic map can be used for planning or controlling future navigational behaviors of a mobile robot, such as the mobile robot 100 configured to clean floor surface in the environment. The method 1900 can be implemented in, and executed by, the semantic map management system 500.

The method 1900 commences at step 1910 where a first semantic map (also referred to as a base semantic map in this document) can be provide to a user, such as via the user interface 540. The first semantic map corresponds to a first mission of the mobile robot (e.g., a cleaning mission for a cleaning robot) in the environment. The first semantic map may include first occupancy information and first semantic annotations. The first occupancy information can include location and geometry of one or more of a free area, an occupied area, or an unexplored area in the environment corresponding to the first mission. In an example, sensor data may be collected using the sensor circuit 510 in a mobile robot, and the first occupancy information may be extracted from the sensor data using the SLAM techniques. An occupancy map of the environment, such as that shown in FIG. 8, can be generated based on the first occupancy information. The first semantic annotations represent spatial and contextual information of objects in the environment corresponding to the first mission of the mobile robot. Examples of the first semantic annotations may include annotations of a location, an identity, or a state of an object or a device in the environment, mutual constraints among the objects or devices, among other characteristics. By way of example and not limitation, the exemplary semantic map 900 in FIG. 9 illustrates semantic annotations including walls, dividers, rooms, clutters, and mutual constraints among the objects in the environment.

The first semantic map may be generated automatically such as using the semantic map generator 523, or through user input. In an example, SLAM techniques may be used to detect, classify, or identify objects, determine a state or other characteristics of the objects using sensor data, and semantic annotations of the detected and classified objects can be generated and included in the first semantic map, such as described above with reference to the semantic map generator 523. Alternatively, semantic annotations, including object identification, object attributes, state, and mutual constraints of spatial relationship between objects, can be manually added or modified by a user via a user interface, such as described above with reference to FIG. 7A.

The first semantic map may be stored in a memory, such as the memory 530. At 1920, a new, second semantic map can be provided to a user, such as via the user interface 540. Each time the mobile robot is set to perform a new mission, a new semantic map may be generated. The second semantic map corresponds to a second mission of the mobile robot subsequent to the first mission in the environment. Similar to the first semantic map, the second semantic map may include second occupancy information and second semantic annotations. In an example, to generate the second sematic annotation, the first semantic annotations can be transferred from the first semantic map to the second semantic map, such as via the SA transfer module 524. The second semantic annotations can be generated based on the transferred semantic annotations.

At 1930, user input may be received, such as via a user interface, to modify the first or the second semantic annotations from the respective semantic maps. In an example as illustrated in FIG. 7A, through various control elements, a user may interactively select, deselect, add, delete, translate, rotate, modify, or label a semantic annotation on a semantic map. In an example, the mobile robot may automatically modify the first or the second semantic annotations on the respective semantic maps, and the user can accept, reject, or modify such automatic modification of the semantic annotations. In some examples, the mobile robot may automatically generate two or more modified first semantic maps each including respective modifications of the first semantic annotations thereon, and a user may select one of the two or more modified first semantic maps.

One example of modifying the semantic annotations is semantic conflict detection and resolution, as discussed above with reference to the SA conflict detector 525 and the SA conflict resolver 526. The semantic conflict represents missing or altered semantics during transfer from the first semantic map to the second semantic map. FIGS. 11, 12A-12B, 13A-13B, and 14A-14B illustrate various examples of unsuccessful transfer leading to semantic conflicts between the second and the first semantic annotations. The user input received at 1930 may include information about identification of semantic conflict (e.g., objects that are missing or altered), or a user's feedback on automatically detected semantic conflicts, such as the conflict resolution based on the difference map and semantic map reconstruction by adding back the portion of the difference map adjoining a conflict region, as described above with reference to FIGS. 15A-15B and 16A-16C. In some examples, the received user input may be directed to resolving the user-identified semantic conflict or the automatically detected semantic conflict, or instructions to reject updating the first semantic map if the user-identified semantic conflict or the automatically detected semantic conflict satisfies a condition, as discussed above with reference to FIG. 7B.

Another example of modifying the semantic annotations is semantic discovery, as discussed above with reference to the SA discovery module 527. Examples of the novel semantics may include previously unexplored or undocumented region such as a new room in the environment, one or more separators added to the new (second) semantic map to resolve conflicts between the base semantic map and the new semantic map, as described above with reference to FIGS. 17A-17B and 18A-18C. The user input received at 1930 may include a user input of an identification of a novel semantic object presented on the second semantic map and absent from the stored base semantic map, or a user's feedback on automatically generated supplemental semantic annotations, such as to accept, reject, or modify any of those automatically generated supplemental semantic annotations, as discussed above with reference to FIG. 7C. In an example, the mobile robot can automatically generate a selectable set of two or more modified semantic maps each including respective supplemental semantic annotations for the discovered novel semantic objects. A user may select one from the selectable set of semantic maps.

At 1940, the first semantic map may be updated based on a comparison between the second semantic map and the first semantic map, such as using the semantic map update module 528. The semantic map update can be triggered by the second semantic annotations satisfying a validity criterion and mutual constraints among the semantic annotations. If the second semantic map passes the validity and constraint check, it may replace the base semantic map, and be stored in the memory 530 as a new base semantic map. At 1950, path planning and robot navigation in future robot missions can be determined in accordance with the new semantic map, such as using the navigation controller 529.

If the new semantic map does not pass the validity and constraint check, the original base semantic map remains valid. At 1950, path planning and robot navigation in future robot missions can be determined in accordance with the previously stored first semantic map. Preserving the original base semantic map maintains semantic consistency, even though some semantic information may be missing as the robot performs subsequent missions. In an example, update of a semantic map may be performed at least partially through a user input via the user interface 540, such as a user instruction to replace the first semantic map with the second semantic map and save the latter in the memory for use in future robot missions, as described above with reference to FIG. 7D.

Examples of Machine-Readable Medium in Semantic Map Management

Figure 20:
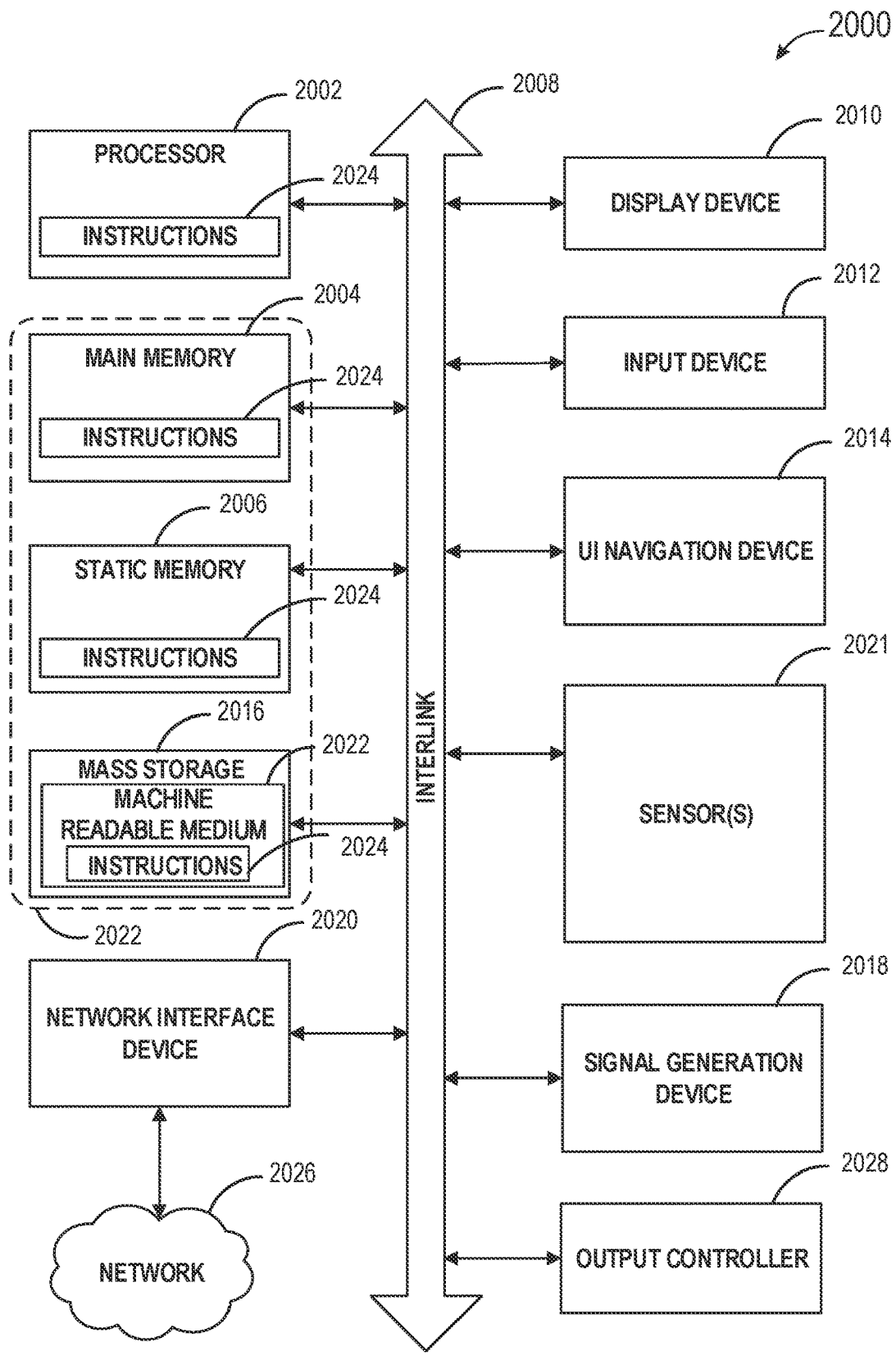
FIG. 20 is a block diagram illustrating an example machine upon which any one or more of the techniques (e.g., methodologies) discussed herein may perform.

FIG. 20 illustrates generally a block diagram of an example machine 2000 upon which any one or more of the techniques (e.g., methodologies) discussed herein may perform. Portions of this description may apply to the computing framework of various portions of the mobile robot 100, the mobile device 404, or other computing system such as a local computer system or the cloud computing system 406.

In alternative embodiments, the machine 2000 may operate as a standalone device or may be connected (e.g., networked) to other machines. In a networked deployment, the machine 2000 may operate in the capacity of a server machine, a client machine, or both in server-client network environments. In an example, the machine 2000 may act as a peer machine in peer-to-peer (P2P) (or other distributed) network environment. The machine 2000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 2000 may include a hardware processor 2002 (e.g., a central processing unit (CPU), a graphics processing unit (GPU), a hardware processor core, or any combination thereof), a main memory 2004 and a static memory 2006, some or all of which may communicate with each other via an interlink (e.g., bus) 2008. The machine 2000 may further include a display unit 2010 (e.g., a raster display, vector display, holographic display, etc.), an alphanumeric input device 2012 (e.g., a keyboard), and a user interface (UI) navigation device 2014 (e.g., a mouse). In an example, the display unit 2010, input device 2012 and UI navigation device 2014 may be a touch screen display. The machine 2000 may additionally include a storage device (e.g., drive unit) 2016, a signal generation device 2018 (e.g., a speaker), a network interface device 2020, and one or more sensors 2021, such as a global positioning system (GPS) sensor, compass, accelerometer, or other sensor. The machine 2000 may include an output controller 2028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2016 may include a machine readable medium 2022 on which is stored one or more sets of data structures or instructions 2024 (e.g., software) embodying or utilized by any one or more of the techniques or functions described herein. The instructions 2024 may also reside, completely or at least partially, within the main memory 2004, within static memory 2006, or within the hardware processor 2002 during execution thereof by the machine 2000. In an example, one or any combination of the hardware processor 2002, the main memory 2004, the static memory 2006, or the storage device 2016 may constitute machine readable media.

While the machine-readable medium 2022 is illustrated as a single medium, the term "machine readable medium" may include a single medium or multiple media (e.g., a centralized or distributed database, and/or associated caches and servers) configured to store the one or more instructions 2024.

The term "machine readable medium" may include any medium that is capable of storing, encoding, or carrying instructions for execution by the machine 2000 and that cause the machine 2000 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM). Electrically Erasable Programmable Read-Only Memory (EPSOM)) and flash memory devices; magnetic disks, such as internal hard disks and removable disks; magneto-optical disks; and CD-ROM and DVD-ROM disks.

The instructions 2024 may further be transmitted or received over a communication network 2026 using a transmission medium via the network interface device 2020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WiFi®. IEEE 802.16 family of standards known as WiMax®), IEEE 802.15.4 family of standards, peer-to-peer (P2P) networks, among others. In an example, the network interface device 2020 may include one or more physical jacks (e.g., Ethernet, coaxial, or phone jacks) or one or more antennas to connect to the communication network 2026. In an example, the network interface device 2020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2000, and includes digital or analog communications signals or other intangible medium to facilitate communication of such software.

Various embodiments are illustrated in the figures above. One or more features from one or more of these embodiments may be combined to form other embodiments.

The method examples described herein can be machine or computer-implemented at least in part. Some examples may include a computer-readable medium or machine-readable medium encoded with instructions operable to configure an electronic device or system to perform methods as described in the above examples. An implementation of such methods may include code, such as microcode, assembly language code, a higher-level language code, or the like. Such code may include computer readable instructions for performing various methods. The code can form portions of computer program products. Further, the code can be tangibly stored on one or more volatile or non-volatile computer-readable media during execution or at other times.

The above detailed description is intended to be illustrative, and not restrictive. The scope of the disclosure should therefore be determined with references to the appended claims, along with the full scope of equivalents to which such claims are entitled.

What is claimed is:

1. A mobile robot, comprising:
    a drive system configured to move the mobile robot about an environment;
    a sensor circuit configured to sense occupancy information in the environment;
    a memory;
    a controller circuit configured to:
        generate, and store in the memory, a first semantic map corresponding to a first mission of the mobile robot in the environment using first occupancy information and first semantic annotations, the first semantic annotations representing spatial and contextual information of objects in the environment corresponding to the first mission;
        transfer the first semantic annotations from the first semantic map to a second semantic map, the second semantic map corresponding to a second mission of the mobile robot in the environment subsequent to the first mission;
        generate the second semantic map using second occupancy information and second semantic annotations, the second semantic annotations representing spatial and contextual information of objects in the environment and being generated using the transferred first semantic annotations;
        detect a novel semantic object from the second semantic map in response to a size of a semantically annotated region on the second semantic map exceeding, by a threshold, a size of a corresponding semantically annotated region on the first semantic map;
        determine whether or not to update the first semantic map based on the detected novel semantic object in the second semantic map or a semantic conflict between the first and the second semantic maps; and
        prompt a user to provide feedback including confirming or rejecting the novel semantic object or the semantic conflict; and
    a communication system configured to transmit information about one or more of the first or the second semantic map to a user interface, and to receive the user feedback.

2. The mobile robot of claim 1, wherein controller circuit is configured to plan a path or to navigate the mobile robot about the environment according to an updated first semantic map if the second semantic annotations satisfy a validity and constraint check, or according to the first semantic map if the second semantic annotations fail to satisfy the validity and constraint check.

3. The mobile robot of claim 1, wherein the first and the second occupancy information each include location and geometry of one or more of a free area, an occupied area, or an unexplored area in the environment corresponding to respective missions; and
    wherein the controller circuit is configured to generate a first occupancy map using the first occupancy information, and to generate a second occupancy map using the second occupancy information.

4. The mobile robot of claim 1, wherein the first semantic annotations and the second semantic annotations each include characteristics of the objects in the environment, the characteristics including one or more of:
    an object identification;
    an object location;
    a physical attribute of an object; or a spatial constraint of an object relative to another object in the environment.

5. The mobile robot of claim 1, wherein the controller circuit is configured to:
classify the objects into a plurality of object types; and
generate the first semantic annotations or the second semantic annotations based on the classification of the objects.

6. The mobile robot of claim 1, wherein the communication system is configured to receive a user input for generating or modifying the first or the second semantic annotations.

7. The mobile robot of claim 1, wherein the controller circuit is configured to transfer the first semantic annotations from the first semantic map to the second semantic map, including:
integrate locations of the first semantic annotations into the mobile robot;
track motions of the first semantic annotations during the second mission in the environment; and
generate the second semantic annotations using the tracked motions of the first semantic annotations.

8. The mobile robot of claim 1, wherein the controller circuit is configured to detect a semantic conflict between the first and second semantic maps using a precision and recall measure between the first and second semantic maps, the semantic conflict representing a semantic annotation included in the first semantic map and absent from the second semantic map.

9. The mobile robot of claim 8, wherein the controller circuit is configured to resolve the detected semantic conflict, including:
generate a difference occupancy map between the first and second occupancy maps;
modify the second occupancy map by adding thereto a portion of the difference occupancy map corresponding to a region on the second semantic map that adjoins the detected semantic conflict; and
reconstruct the second semantic map using the modified second occupancy map and the second semantic annotations.

10. The mobile robot of claim 1, wherein the controller circuit is configured to:
detect the novel semantic object from the second semantic map, the novel semantic object absent from the first semantic map;
include into the second semantic map a supplemental semantic annotation for the novel semantic object if the supplemental semantic annotation satisfies constraints relative to the second semantic annotations on the second semantic map.

11. The mobile robot of claim 10, wherein the supplemental semantic annotation has a relaxed constraint relative to other semantic annotations than mutual constraints among the semantic annotations on the second semantic map.

12. A system, comprising:
a mobile robot, including:
a drive system configured to move the mobile robot about an environment;
a sensor circuit configured to sense occupancy information in the environment;
a memory;
a communication system; and
a controller circuit configured to:
generate, and store in the memory, a first semantic map corresponding to a first mission of the mobile robot in the environment using first occupancy information and first semantic annotations, the first semantic annotations representing spatial and contextual information of objects in the environment corresponding to the first mission;
transfer the first semantic annotations from the first semantic map to a second semantic map, the second semantic map corresponding to a second mission of the mobile robot in the environment subsequent to the first mission;
generate the second semantic map using second occupancy information and the second semantic annotations, the second semantic annotations representing spatial and contextual information of objects in the environment and being generated using the transferred first semantic annotations;
detect a novel semantic object from the second semantic map in response to a size of a semantically annotated region on the second semantic map exceeding, by a threshold, a size of a corresponding semantically annotated region on the first semantic map;
determine whether or not to update the first semantic map based on the detected novel semantic object in the second semantic map or a semantic conflict between the first and the second semantic maps; and
prompt a user to provide feedback including confirming or rejecting the novel semantic object or the semantic conflict; and
a user interface communicatively coupled to the mobile robot, the user interface configured to display the first or the second semantic map, and to receive the user feedback.

13. A method for operating a mobile robot, the method comprising:
providing to a user a first semantic map stored in a memory, the first semantic map corresponding to a first mission of the mobile robot in an environment, the first semantic map including first occupancy information and first semantic annotations, the first semantic annotations representing spatial and contextual information of objects in the environment;
providing to the user a second semantic map corresponding to a second mission of the mobile robot in the environment subsequent to the first mission, the second semantic map including second occupancy information and second semantic annotations, the second semantic annotations representing spatial and contextual information of objects in the environment;
receiving an input from the user to modify the first semantic annotations on the first semantic map, or to modify the second semantic annotations on the second semantic map;
detecting a novel semantic object from the second semantic map in response to a size of a semantically annotated region on the second semantic map exceeding, by a threshold, a size of a corresponding semantically annotated region on the first semantic map;
updating the first semantic map based on the detected novel semantic object in the second semantic map or a semantic conflict between the second semantic map and the first semantic map;
prompting the user to provide feedback including confirming or rejecting the novel semantic object or the semantic conflict; and
storing the updated first semantic map in the memory for use in future missions of the mobile robot.

14. The method of claim 13, comprising planning a path or navigating the mobile robot about the environment according to the updated first semantic map.

15. The method of claim 13, comprising:
transferring the first semantic annotations from the first semantic map to a second semantic map; and
generating the second semantic annotations using the transferred first semantic annotations.

16. The method of claim 13, wherein the user input includes, via a user interface, one or more of selecting, deselecting, adding, deleting, translating, rotating, modifying, or labelling a semantic annotation from the first or the second semantic map.

17. The method of claim 13, comprising:
automatically modifying, via the mobile robot, the first or the second semantic annotations; and
receiving a user input to accept or reject the automatic modification of the first or the second semantic annotations.

18. The method of claim 13, further comprising:
receiving from the user an identification of a semantic conflict between the first and the second semantic maps, or a user feedback on an automatically detected semantic conflict between the first and the second semantic maps; and
receiving a user input for resolving the user-identified semantic conflict or the automatically detected semantic conflict, or a user input to reject updating the first semantic map if the user-identified semantic conflict or the automatically detected semantic conflict satisfies a condition.

19. The method of claim 13, comprising:
receiving from a user an identification of the novel semantic object presented on the second semantic map and absent from the stored first semantic map, or a user feedback on an automatically detected novel semantic object; and
including a supplemental semantic annotation for the novel semantic object into the second semantic map if the supplemental semantic annotation satisfies constraints relative to the second semantic annotations on the second semantic map.

* * * * *

UNITED STATES PATENT AND TRADEMARK OFFICE
CERTIFICATE OF CORRECTION

PATENT NO. : 11,571,813 B2
APPLICATION NO. : 16/804749
DATED : February 7, 2023
INVENTOR(S) : Narayana et al.

It is certified that error appears in the above-identified patent and that said Letters Patent is hereby corrected as shown below:

On the Title Page

On page 2, in Column 2, item (56) under "Other Publications", Line 42, delete "Manufacturning"," and insert --Manufacturing",-- therefor Signed and Sealed this
Thirteenth Day of February, 2024

Katherine Kelly Vidal
*Director of the United States Patent and Trademark Office*